US012639335B2

(12) United States Patent
Upadhyay et al.

(10) Patent No.: US 12,639,335 B2
(45) Date of Patent: *May 26, 2026

(54) TECHNIQUES FOR ASYNCHRONOUSLY PUSHING METADATA IN BULK

(71) Applicant: Rubrik, Inc., Palo Alto, CA (US)

(72) Inventors: Dhawal Upadhyay, Bangalore (IN); Shubham Tagra, Bangalore (IN); Akhilesh Krishnan, Sunnyvale, CA (US); Vijay Vijay Karthik, Santa Clara, CA (US); Akshay Agrawal, Bangalore (IN)

(73) Assignee: Rubrik, Inc., Palo Alto, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/959,476

(22) Filed: Nov. 25, 2024

(65) Prior Publication Data

US 2025/0086201 A1 Mar. 13, 2025

Related U.S. Application Data

(63) Continuation of application No. 18/205,421, filed on Jun. 2, 2023, now Pat. No. 12,182,165.

(51) Int. Cl.
G06F 7/00 (2006.01)
G06F 16/2458 (2019.01)
G06F 16/27 (2019.01)

(52) U.S. Cl.
CPC ........ G06F 16/273 (2019.01); G06F 16/2474 (2019.01)

(58) Field of Classification Search
CPC ............... G06F 16/273; G06F 16/2474; G06F 2201/84; G06F 11/1448
See application file for complete search history.

(56) References Cited

U.S. PATENT DOCUMENTS 3,569,940 A * 3/1971 McFadden ............ G06F 11/327
714/E11.187
8,150,805 B1 * 4/2012 Tawri ................... G06F 21/6218
707/610
8,364,648 B1 * 1/2013 Sim-Tang ............... G06F 16/20
707/674

(Continued)

*Primary Examiner* — Mohammed R Uddin
(74) *Attorney, Agent, or Firm* — Holland & Hart LLP

(57) ABSTRACT

Methods, systems, and devices for data management are described. A first application in a destination computing environment of a data management system (DMS) may determine that a bulk-push criterion is satisfied for a second application in a source computing environment of the DMS. The first application may transmit, to an asynchronous metadata service, a request indicating the second application for which the bulk-push criterion is satisfied. The request may be configured to cause the asynchronous metadata service to query a database in the source computing environment, identify a latest version of one or more rows that include metadata associated with the second application, and generate data records indicating the latest version of the one or more rows that include the metadata associated with the second application. The first application may receive the data records via an asynchronous data stream between the first application and the second application.

20 Claims, 9 Drawing Sheets

(56)                References Cited

U.S. PATENT DOCUMENTS

| | | | |
|---|---|---|---|
| 9,032,022 B1* | 5/2015 | Dunn ................. H04L 47/2433 |
| | | | 709/201 |
| 10,911,536 B2* | 2/2021 | Gumerato .......... H04L 67/1095 |
| 11,237,771 B1* | 2/2022 | Shveidel ................. G06F 3/065 |
| 11,249,983 B2* | 2/2022 | Kumar .................... G06F 16/27 |
| 11,360,689 B1* | 6/2022 | Grunwald .......... G06F 16/2379 |
| 11,442,652 B1* | 9/2022 | Dailey ............... H04L 67/1097 |
| 11,687,500 B1* | 6/2023 | Grunwald .............. G06F 3/061 |
| | | | 707/610 |
| 11,693,827 B2* | 7/2023 | Mazukabzov .......... H04L 67/10 |
| | | | 707/624 |
| 11,914,480 B2* | 2/2024 | Agarwal ............. G06F 16/9027 |
| 2002/0103811 A1* | 8/2002 | Fankhauser ........... G16H 40/67 |
| 2004/0193952 A1* | 9/2004 | Narayanan ........... G06F 16/273 |
| | | | 714/13 |
| 2005/0015436 A1* | 1/2005 | Singh .................... G06F 16/278 |
| | | | 707/999.01 |
| 2006/0053305 A1* | 3/2006 | Wahlert .............. G06F 11/1451 |
| | | | 713/189 |
| 2006/0200533 A1* | 9/2006 | Holenstein ........... G06F 16/273 |
| | | | 709/208 |
| 2011/0047413 A1* | 2/2011 | McGill et al. ...... G06F 11/2002 |
| | | | 717/172 |
| 2011/0125712 A1* | 5/2011 | Kaila ...................... G06F 16/44 |
| | | | 707/626 |
| 2014/0067760 A1* | 3/2014 | Rajendran .......... G06F 16/2372 |
| | | | 707/624 |

| | | | |
|---|---|---|---|
| 2014/0337284 A1* | 11/2014 | Orth ........................ G06F 16/16 |
| | | | 707/610 |
| 2015/0101021 A1* | 4/2015 | Mc Erlean ............. H04L 63/02 |
| | | | 707/625 |
| 2015/0317212 A1* | 11/2015 | Lee ...................... G06F 11/1458 |
| | | | 707/685 |
| 2015/0363271 A1* | 12/2015 | Haustein ............. G06F 16/1873 |
| | | | 707/682 |
| 2016/0184726 A1* | 6/2016 | Andersson ....... H04N 21/42202 |
| | | | 710/8 |
| 2016/0321338 A1* | 11/2016 | Isherwood .......... H04L 67/1097 |
| 2016/0350358 A1* | 12/2016 | Patel .................. G06F 16/1748 |
| 2017/0011062 A1* | 1/2017 | Zaveri ................. G06F 16/2379 |
| 2017/0300250 A1* | 10/2017 | Sterns ................... G06F 3/0683 |
| 2019/0354628 A1* | 11/2019 | Grunwald .......... G06F 11/2097 |
| 2020/0089789 A1* | 3/2020 | Mace .................... G06F 9/4881 |
| 2020/0097580 A1* | 3/2020 | Nayak .................. G06F 16/907 |
| 2020/0192875 A1* | 6/2020 | Rudolf ................ G06F 16/1734 |
| 2021/0081432 A1* | 3/2021 | Grunwald .......... G06F 11/1471 |
| 2021/0149915 A1* | 5/2021 | Lee ...................... G06F 16/2282 |
| 2021/0303527 A1* | 9/2021 | Grunwald .......... G06F 16/1824 |
| 2021/0342299 A1* | 11/2021 | Kumarasamy ........ G06F 16/128 |
| 2022/0263897 A1* | 8/2022 | Karr .................... G06F 11/1448 |
| 2023/0185559 A1* | 6/2023 | Landman ................. G06F 8/65 |
| | | | 717/171 |
| 2023/0195806 A1* | 6/2023 | Bhashyam .......... G06F 16/2358 |
| | | | 707/709 |
| 2023/0350858 A1* | 11/2023 | Karr ....................... G06F 3/0664 |
| 2024/0118905 A1* | 4/2024 | Kondiles ................ G06F 9/442 |

* cited by examiner

Table_A

| Primary_key | Gen_number | Col_a | Col_b |
|---|---|---|---|
| 1 | 2 | xx | yy |
| 2 | 2 | xx | yy |
| 3 | 2 | xx | yy |

Table_generation_numbers

| Table_name | Latest_gen_number |
|---|---|
| Table_A | 2 |

Table_A

| Primary_key | Gen_number | Col_a | Col_b |
|---|---|---|---|
| 1 | 3 | xx | yy |
| 2 | 2 | xx | yy |
| 3 | 3 | xx | yy |

Table_generation_numbers

| Table_name | Latest_gen_number |
|---|---|
| Table_A | 3 |

405

Table_A

| Primary_key | Gen_number | Col_a | Col_b |
|---|---|---|---|
| 1 | 3 | xx | yy |
| 3 | 3 | xx | yy |

400

Figure 9:
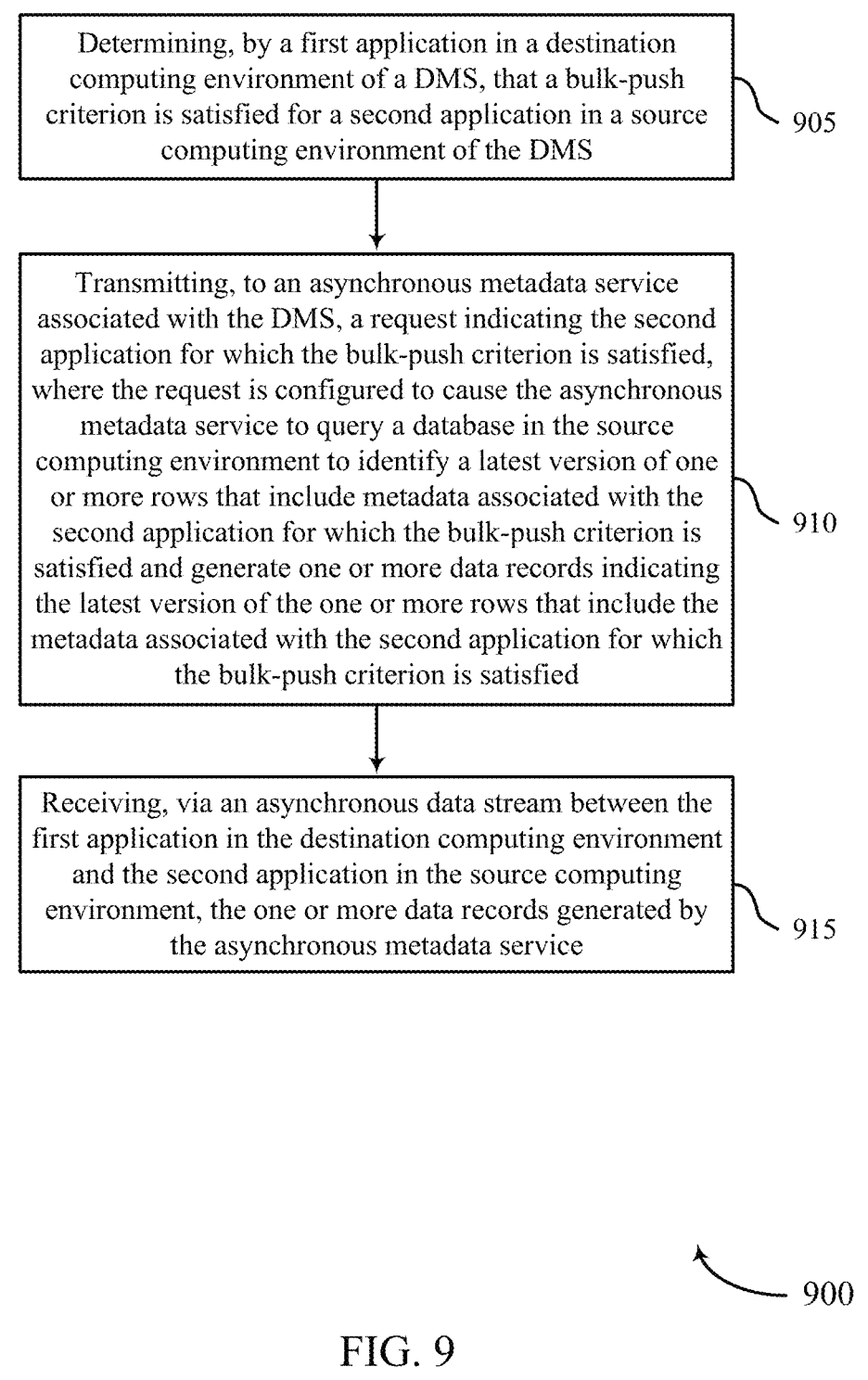

Determining, by a first application in a destination computing environment of a DMS, that a bulk-push criterion is satisfied for a second application in a source computing environment of the DMS ⟍ 905

Transmitting, to an asynchronous metadata service associated with the DMS, a request indicating the second application for which the bulk-push criterion is satisfied, where the request is configured to cause the asynchronous metadata service to query a database in the source computing environment to identify a latest version of one or more rows that include metadata associated with the second application for which the bulk-push criterion is satisfied and generate one or more data records indicating the latest version of the one or more rows that include the metadata associated with the second application for which the bulk-push criterion is satisfied ⟍ 910

Receiving, via an asynchronous data stream between the first application in the destination computing environment and the second application in the source computing environment, the one or more data records generated by the asynchronous metadata service ⟍ 915

TECHNIQUES FOR ASYNCHRONOUSLY PUSHING METADATA IN BULK

CROSS REFERENCE

The present Application for Patent is a continuation of U.S. patent application Ser. No. 18/205,421 by UPADHYAY et al., entitled "TECHNIQUES FOR ASYNCHRONOUSLY PUSHING METADATA IN BULK," filed Jun. 2, 2023, assigned to the assignee hereof, and expressly incorporated by reference herein.

FIELD OF TECHNOLOGY

The present disclosure relates generally to data management, including techniques for asynchronously pushing metadata in bulk.

BACKGROUND

A data management system (DMS) may be employed to manage data associated with one or more computing systems. The data may be generated, stored, or otherwise used by the one or more computing systems, examples of which may include servers, databases, virtual machines, cloud computing systems, file systems (e.g., network-attached storage (NAS) systems), or other data storage or processing systems. The DMS may provide data backup, data recovery, data classification, or other types of data management services for data of the one or more computing systems. Improved data management may offer improved performance with respect to reliability, speed, efficiency, scalability, security, or ease-of-use, among other possible aspects of performance.

BRIEF DESCRIPTION OF THE DRAWINGS

FIG. 9 shows a flowchart illustrating methods that support techniques for asynchronously pushing metadata in bulk according to one or more aspects of the present disclosure.

DETAILED DESCRIPTION

Figure 1:
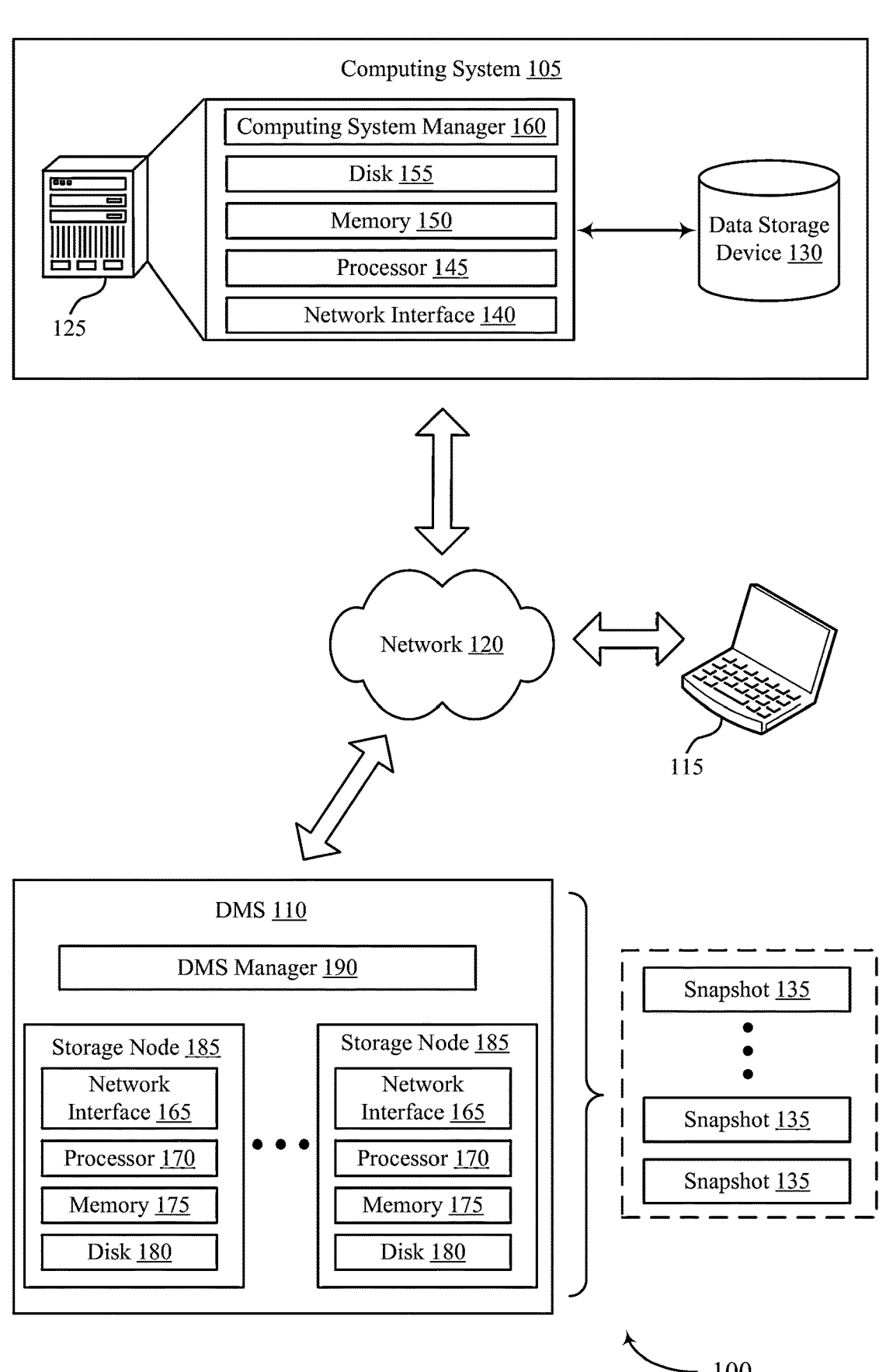
FIG. 1 illustrates an example of a computing environment that supports techniques for asynchronously pushing metadata in bulk according to one or more aspects of the present disclosure.

A data management system (DMS) may include various distributed nodes or node clusters that provide backup and recovery services for client systems. Some backup processes within the DMS may involve exchanging metadata between applications running in different data centers or cloud environments. For example, an application running in a source computing environment (referred to hereinafter as the source) may push metadata to an application running in a destination computing environment (referred to hereinafter as the destination) such that the metadata is synchronized across the source and the destination. The destination may use the metadata provided by the source to perform various tasks related to database backup, recovery, duplication, restoration, etc.

In some cases, to reduce the volume of information that is transferred from the source to the destination, the source may identify which rows (i.e., within a table that includes metadata associated with the source) have changed since the last exchange, and may push the changed rows to the destination via data records that are processed and stored at the destination. However, if the source becomes disconnected from the destination (and is thus unable to push metadata updates to the destination) or if a backlog of metadata updates accumulates at the source, the destination may be unable to handle (i.e., process) all of the data records. Similarly, if the source is being initialized for the first time, there may be a prohibitive amount of metadata for the destination to process.

Aspects of the present disclosure support techniques for efficiently pushing bulk metadata updates (e.g., updates that involve a relatively large number of metadata changes) from a source application to a destination application. If, for example, the source is being initialized for the first time, the source may have to transfer a greater amount of metadata to the destination (e.g., because the destination has no previous metadata associated with the source). In such examples, the source may reduce the amount of metadata that is transferred to the destination by pushing only the latest (i.e., current) version of the metadata to the destination. Additionally, or alternatively, if the source accumulates a backlog of metadata updates and some of the updates pertain to the same rows, the source can resolve the backlog by pushing only the current values of these rows to the destination. Similarly, if the source becomes disconnected from the destination for an extended period of time (e.g., due to a network outage) and some rows are repeatedly changed in the interim, the source may selectively push the latest values of the rows to the destination when the connection is re-established (for example, by discarding changes that are overwritten by more recent changes).

Aspects of the present disclosure may be implemented to realize one or more of the following advantages. The techniques described herein may enable applications to exchange and synchronize metadata with greater efficiency, lower signaling overhead, and reduced latency, among other benefits. For example, invoking an asynchronous metadata service (also referred to herein as a replay service) with direct access to source metadata may enable applications to resolve metadata backlogs, quickly initialize new data sources, and periodically exchange metadata when real-time synchronization is not required. As a result, the applications may process fewer extraneous/outdated data records, experience fewer service disruptions, and recover from metadata backlogs with greater efficiency.

FIG. 1 illustrates an example of a computing environment 100 that supports techniques for asynchronously pushing metadata in bulk according to one or more aspects of the present disclosure. The computing environment 100 may include a computing system 105, a DMS 110, and one or more computing devices 115, which may be in communication with one another via a network 120. The computing system 105 may generate, store, process, modify, or otherwise use associated data, and the DMS 110 may provide one or more data management services for the computing system 105. For example, the DMS 110 may provide a data backup service, a data recovery service, a data classification service, a data transfer or replication service, one or more other data management services, or any combination thereof for data associated with the computing system 105.

The network 120 may allow the one or more computing devices 115, the computing system 105, and the DMS 110 to communicate (e.g., exchange information) with one another. The network 120 may include aspects of one or more wired networks (e.g., the Internet), one or more wireless networks (e.g., cellular networks), or any combination thereof. The network 120 may include aspects of one or more public networks or private networks, as well as secured or unsecured networks, or any combination thereof. The network 120 also may include any quantity of communications links and any quantity of hubs, bridges, routers, switches, ports or other physical or logical network components.

A computing device 115 may be used to input information to or receive information from the computing system 105, the DMS 110, or both. For example, a user of the computing device 115 may provide user inputs via the computing device 115, which may result in commands, data, or any combination thereof being communicated via the network 120 to the computing system 105, the DMS 110, or both. Additionally or alternatively, a computing device 115 may output (e.g., display) data or other information received from the computing system 105, the DMS 110, or both. A user of a computing device 115 may, for example, use the computing device 115 to interact with one or more user interfaces (e.g., graphical user interfaces (GUIs)) to operate or otherwise interact with the computing system 105, the DMS 110, or both. Though one computing device 115 is shown in FIG. 1, it is to be understood that the computing environment 100 may include any quantity of computing devices 115.

A computing device 115 may be a stationary device (e.g., a desktop computer or access point) or a mobile device (e.g., a laptop computer, tablet computer, or cellular phone). In some examples, a computing device 115 may be a commercial computing device, such as a server or collection of servers. And in some examples, a computing device 115 may be a virtual device (e.g., a virtual machine). Though shown as a separate device in the example computing environment of FIG. 1, it is to be understood that in some cases a computing device 115 may be included in (e.g., may be a component of) the computing system 105 or the DMS 110.

The computing system 105 may include one or more servers 125 and may provide (e.g., to the one or more computing devices 115) local or remote access to applications, databases, or files stored within the computing system 105. The computing system 105 may further include one or more data storage devices 130. Though one server 125 and one data storage device 130 are shown in FIG. 1, it is to be understood that the computing system 105 may include any quantity of servers 125 and any quantity of data storage devices 130, which may be in communication with one another and collectively perform one or more functions ascribed herein to the server 125 and data storage device 130.

A data storage device 130 may include one or more hardware storage devices operable to store data, such as one or more hard disk drives (HDDs), magnetic tape drives, solid-state drives (SSDs), storage area network (SAN) storage devices, or network-attached storage (NAS) devices. In some cases, a data storage device 130 may comprise a tiered data storage infrastructure (or a portion of a tiered data storage infrastructure). A tiered data storage infrastructure may allow for the movement of data across different tiers of the data storage infrastructure between higher-cost, higher-performance storage devices (e.g., SSDs and HDDs) and relatively lower-cost, lower-performance storage devices (e.g., magnetic tape drives). In some examples, a data storage device 130 may be a database (e.g., a relational database), and a server 125 may host (e.g., provide a database management system for) the database.

A server 125 may allow a client (e.g., a computing device 115) to download information or files (e.g., executable, text, application, audio, image, or video files) from the computing system 105, to upload such information or files to the computing system 105, or to perform a search query related to particular information stored by the computing system 105. In some examples, a server 125 may act as an application server or a file server. In general, a server 125 may refer to one or more hardware devices that act as the host in a client-server relationship or a software process that shares a resource with or performs work for one or more clients.

A server 125 may include a network interface 140, processor 145, memory 150, disk 155, and computing system manager 160. The network interface 140 may enable the server 125 to connect to and exchange information via the network 120 (e.g., using one or more network protocols). The network interface 140 may include one or more wireless network interfaces, one or more wired network interfaces, or any combination thereof. The at least one processor 145 may execute computer-readable instructions stored in the at least one memory 150 in order to cause the server 125 to perform functions ascribed herein to the server 125. The at least one processor 145 may include one or more processing units, such as one or more central processing units (CPUs), one or more graphics processing units (GPUs), or any combination thereof.

The at least one memory 150 may comprise one or more types of memory (e.g., random access memory (RAM), static random access memory (SRAM), dynamic random access memory (DRAM), read-only memory ((ROM), electrically erasable programmable read-only memory (EEPROM), Flash, etc.). Disk 155 may include one or more HDDs, one or more SSDs, or any combination thereof. Memory 150 and disk 155 may comprise hardware storage devices. The computing system manager 160 may manage the computing system 105 or aspects thereof (e.g., based on instructions stored in the at least one memory 150 and executed by the at least one processor 145) to perform functions ascribed herein to the computing system 105. In some examples, the network interface 140, processor 145, memory 150, and disk 155 may be included in a hardware layer of a server 125, and the computing system manager 160 may be included in a software layer of the server 125. In some cases, the computing system manager 160 may be distributed across (e.g., implemented by) multiple servers 125 within the computing system 105.

In some examples, the computing system 105 or aspects thereof may be implemented within one or more cloud computing environments, which may alternatively be referred to as cloud environments. Cloud computing may refer to Internet-based computing, wherein shared resources, software, and/or information may be provided to one or more computing devices on-demand via the Internet. A cloud environment may be provided by a cloud platform, where the cloud platform may include physical hardware components (e.g., servers) and software components (e.g., operating system) that implement the cloud environment. A cloud environment may implement the computing system 105 or aspects thereof through Software-as-a-Service (SaaS) or Infrastructure-as-a-Service (IaaS) services provided by the cloud environment. SaaS may refer to a software distribution model in which applications are hosted by a service provider and made available to one or more client devices over a network (e.g., to one or more computing devices 115 over the network 120). IaaS may refer to a service in which physical computing resources are used to instantiate one or more virtual machines, the resources of which are made available to one or more client devices over a network (e.g., to one or more computing devices 115 over the network 120).

In some examples, the computing system 105 or aspects thereof may implement or be implemented by one or more virtual machines. The one or more virtual machines may run various applications, such as a database server, an application server, or a web server. For example, a server 125 may be used to host (e.g., create, manage) one or more virtual machines, and the computing system manager 160 may manage a virtualized infrastructure within the computing system 105 and perform management operations associated with the virtualized infrastructure.

The computing system manager 160 may manage the provisioning of virtual machines running within the virtualized infrastructure and provide an interface to a computing device 115 interacting with the virtualized infrastructure. For example, the computing system manager 160 may be or include a hypervisor and may perform various virtual machine-related tasks, such as cloning virtual machines, creating new virtual machines, monitoring the state of virtual machines, moving virtual machines between physical hosts for load balancing purposes, and facilitating backups of virtual machines. In some examples, the virtual machines, the hypervisor, or both, may virtualize and make available resources of the disk 155, the at least one memory, the at least one processor 145, the network interface 140, the data storage device 130, or any combination thereof in support of running the various applications. Storage resources (e.g., the disk 155, the at least one memory 150, or the data storage device 130) that are virtualized may be accessed by applications as a virtual disk.

The DMS 110 may provide one or more data management services for data associated with the computing system 105 and may include DMS manager 190 and any quantity of storage nodes 185. The DMS manager 190 may manage operation of the DMS 110, including the storage nodes 185. Though illustrated as a separate entity within the DMS 110, the DMS manager 190 may in some cases be implemented (e.g., as a software application) by one or more of the storage nodes 185. In some examples, the storage nodes 185 may be included in a hardware layer of the DMS 110, and the DMS manager 190 may be included in a software layer of the DMS 110. In the example illustrated in FIG. 1, the DMS 110 is separate from the computing system 105 but in communication with the computing system 105 via the network 120. It is to be understood, however, that in some examples at least some aspects of the DMS 110 may be located within computing system 105. For example, one or more servers 125, one or more data storage devices 130, and at least some aspects of the DMS 110 may be implemented within the same cloud environment or within the same data center.

Storage nodes 185 of the DMS 110 may include respective network interfaces 165, processors 170, memories 175, and disks 180. The network interfaces 165 may enable the storage nodes 185 to connect to one another, to the network 120, or both. A network interface 165 may include one or more wireless network interfaces, one or more wired network interfaces, or any combination thereof. The at least one processor 170 of a storage node 185 may execute computer-readable instructions stored in the at least one memory 175 of the storage node 185 in order to cause the storage node 185 to perform processes described herein as performed by the storage node 185. At least one processor 170 may include one or more processing units, such as one or more CPUs, one or more GPUs, or any combination thereof. The at least one memory 150 may comprise one or more types of memory (e.g., RAM, SRAM, DRAM, ROM, EEPROM, Flash, etc.). A disk 180 may include one or more HDDs, one or more SSDs, or any combination thereof. Memories 175 and disks 180 may comprise hardware storage devices. Collectively, the storage nodes 185 may in some cases be referred to as a storage cluster or as a cluster of storage nodes 185.

The DMS 110 may provide a backup and recovery service for the computing system 105. For example, the DMS 110 may manage the extraction and storage of snapshots 135 associated with different point-in-time versions of one or more target computing objects within the computing system 105. A snapshot 135 of a computing object (e.g., a virtual machine, a database, a filesystem, a virtual disk, a virtual desktop, or other type of computing system or storage system) may be a file (or set of files) that represents a state of the computing object (e.g., the data thereof) as of a particular point in time. A snapshot 135 may also be used to restore (e.g., recover) the corresponding computing object as of the particular point in time corresponding to the snapshot 135. A computing object of which a snapshot 135 may be generated may be referred to as snappable.

Snapshots 135 may be generated at different times (e.g., periodically or on some other scheduled or configured basis) in order to represent the state of the computing system 105 or aspects thereof as of those different times. In some examples, a snapshot 135 may include metadata that defines a state of the computing object as of a particular point in time. For example, a snapshot 135 may include metadata associated with (e.g., that defines a state of) some or all data blocks included in (e.g., stored by or otherwise included in) the computing object. Snapshots 135 (e.g., collectively) may capture changes in the data blocks over time. Snapshots 135 generated for the target computing objects within the computing system 105 may be stored in one or more storage locations (e.g., the disk 155, memory 150, the data storage device 130) of the computing system 105, in the alternative or in addition to being stored within the DMS 110, as described below.

To obtain a snapshot 135 of a target computing object associated with the computing system 105 (e.g., of the entirety of the computing system 105 or some portion thereof, such as one or more databases, virtual machines, or filesystems within the computing system 105), the DMS manager 190 may transmit a snapshot request to the computing system manager 160. In response to the snapshot request, the computing system manager 160 may set the target computing object into a frozen state (e.g., a read-only state). Setting the target computing object into a frozen state may allow a point-in-time snapshot 135 of the target computing object to be stored or transferred.

In some examples, the computing system 105 may generate the snapshot 135 based on the frozen state of the computing object. For example, the computing system 105 may execute an agent of the DMS 110 (e.g., the agent may be software installed at and executed by one or more servers 125), and the agent may cause the computing system 105 to generate the snapshot 135 and transfer the snapshot to the DMS 110 in response to the request from the DMS 110. In some examples, the computing system manager 160 may cause the computing system 105 to transfer, to the DMS 110, data that represents the frozen state of the target computing object, and the DMS 110 may generate a snapshot 135 of the target computing object based on the corresponding data received from the computing system 105.

Once the DMS 110 receives, generates, or otherwise obtains a snapshot 135, the DMS 110 may store the snapshot 135 at one or more of the storage nodes 185. The DMS 110 may store a snapshot 135 at multiple storage nodes 185, for example, for improved reliability. Additionally, or alternatively, snapshots 135 may be stored in some other location connected with the network 120. For example, the DMS 110 may store more recent snapshots 135 at the storage nodes 185, and the DMS 110 may transfer less recent snapshots 135 via the network 120 to a cloud environment (which may include or be separate from the computing system 105) for storage at the cloud environment, a magnetic tape storage device, or another storage system separate from the DMS 110.

Updates made to a target computing object that has been set into a frozen state may be written by the computing system 105 to a separate file (e.g., an update file) or other entity within the computing system 105 while the target computing object is in the frozen state. After the snapshot 135 (or associated data) of the target computing object has been transferred to the DMS 110, the computing system manager 160 may release the target computing object from the frozen state, and any corresponding updates written to the separate file or other entity may be merged into the target computing object.

In response to a restore command (e.g., from a computing device 115 or the computing system 105), the DMS 110 may restore a target version (e.g., corresponding to a particular point in time) of a computing object based on a corresponding snapshot 135 of the computing object. In some examples, the corresponding snapshot 135 may be used to restore the target version based on data of the computing object as stored at the computing system 105 (e.g., based on information included in the corresponding snapshot 135 and other information stored at the computing system 105, the computing object may be restored to its state as of the particular point in time).

Additionally, or alternatively, the corresponding snapshot 135 may be used to restore the data of the target version based on data of the computing object as included in one or more backup copies of the computing object (e.g., file-level backup copies or image-level backup copies). Such backup copies of the computing object may be generated in conjunction with or according to a separate schedule than the snapshots 135. For example, the target version of the computing object may be restored based on the information in a snapshot 135 and based on information included in a backup copy of the target object generated prior to the time corresponding to the target version. Backup copies of the computing object may be stored at the DMS 110 (e.g., in the storage nodes 185) or in some other location connected with the network 120 (e.g., in a cloud environment, which in some cases may be separate from the computing system 105).

In some examples, the DMS 110 may restore the target version of the computing object and transfer the data of the restored computing object to the computing system 105. And in some examples, the DMS 110 may transfer one or more snapshots 135 to the computing system 105, and restoration of the target version of the computing object may occur at the computing system 105 (e.g., as managed by an agent of the DMS 110, where the agent may be installed and operate at the computing system 105).

In response to a mount command (e.g., from a computing device 115 or the computing system 105), the DMS 110 may instantiate data associated with a point-in-time version of a computing object based on a snapshot 135 corresponding to the computing object (e.g., along with data included in a backup copy of the computing object) and the point-in-time. The DMS 110 may then allow the computing system 105 to read or modify the instantiated data (e.g., without transferring the instantiated data to the computing system). In some examples, the DMS 110 may instantiate (e.g., virtually mount) some or all of the data associated with the point-in-time version of the computing object for access by the computing system 105, the DMS 110, or the computing device 115.

In some examples, the DMS 110 may store different types of snapshots, including for the same computing object. For example, the DMS 110 may store both base snapshots 135 and incremental snapshots 135. A base snapshot 135 may represent the entirety of the state of the corresponding computing object as of a point in time corresponding to the base snapshot 135. An incremental snapshot 135 may represent the changes to the state—which may be referred to as the delta—of the corresponding computing object that have occurred between an earlier or later point in time corresponding to another snapshot 135 (e.g., another base snapshot 135 or incremental snapshot 135) of the computing object and the incremental snapshot 135. In some cases, some incremental snapshots 135 may be forward-incremental snapshots 135 and other incremental snapshots 135 may be reverse-incremental snapshots 135.

To generate a full snapshot 135 of a computing object using a forward-incremental snapshot 135, the information of the forward-incremental snapshot 135 may be combined with (e.g., applied to) the information of an earlier base snapshot 135 of the computing object along with the information of any intervening forward-incremental snapshots 135, where the earlier base snapshot 135 may include a base snapshot 135 and one or more reverse-incremental or forward-incremental snapshots 135. To generate a full snapshot 135 of a computing object using a reverse-incremental snapshot 135, the information of the reverse-incremental snapshot 135 may be combined with (e.g., applied to) the information of a later base snapshot 135 of the computing object along with the information of any intervening reverse-incremental snapshots 135.

In some examples, the DMS 110 may provide a data classification service, a malware detection service, a data transfer or replication service, backup verification service, or any combination thereof, among other possible data management services for data associated with the computing system 105. For example, the DMS 110 may analyze data included in one or more computing objects of the computing system 105, metadata for one or more computing objects of the computing system 105, or any combination thereof, and based on such analysis, the DMS 110 may identify locations within the computing system 105 that include data of one or more target data types (e.g., sensitive data, such as data subject to privacy regulations or otherwise of particular interest) and output related information (e.g., for display to a user via a computing device 115). Additionally or alternatively, the DMS 110 may detect whether aspects of the computing system 105 have been impacted by malware (e.g., ransomware). Additionally or alternatively, the DMS 110 may relocate data or create copies of data based on using one or more snapshots 135 to restore the associated computing object within its original location or at a new location (e.g., a new location within a different computing system 105). Additionally or alternatively, the DMS 110 may analyze backup data to ensure that the underlying data (e.g., user data or metadata) has not been corrupted. The DMS 110 may perform such data classification, malware detection, data transfer or replication, or backup verification, for example, based on data included in snapshots 135 or backup copies of the computing system 105, rather than live contents of the computing system 105, which may beneficially avoid adversely affecting (e.g., infecting, loading, etc.) the computing system 105.

In accordance with the techniques described herein, a first application in a destination computing environment of the DMS 110 may determine that a bulk-push criterion is satisfied for a second application in a source computing environment of the DMS 110. Accordingly, the first application may transmit, to an asynchronous metadata service associated with the DMS 110, a request indicating the second application for which the bulk-push criterion is satisfied. The request may be configured to cause the asynchronous metadata service to query a database in the source computing environment to identify a latest version of one or more rows that include metadata associated with the second application. The request may be further configured to cause the asynchronous metadata service to generate one or more data records that include the latest version of the one or more rows from the database. The first application may receive, via an asynchronous data stream between the first application and the second application, the one or more data records generated by the asynchronous metadata service.

Figure 2:
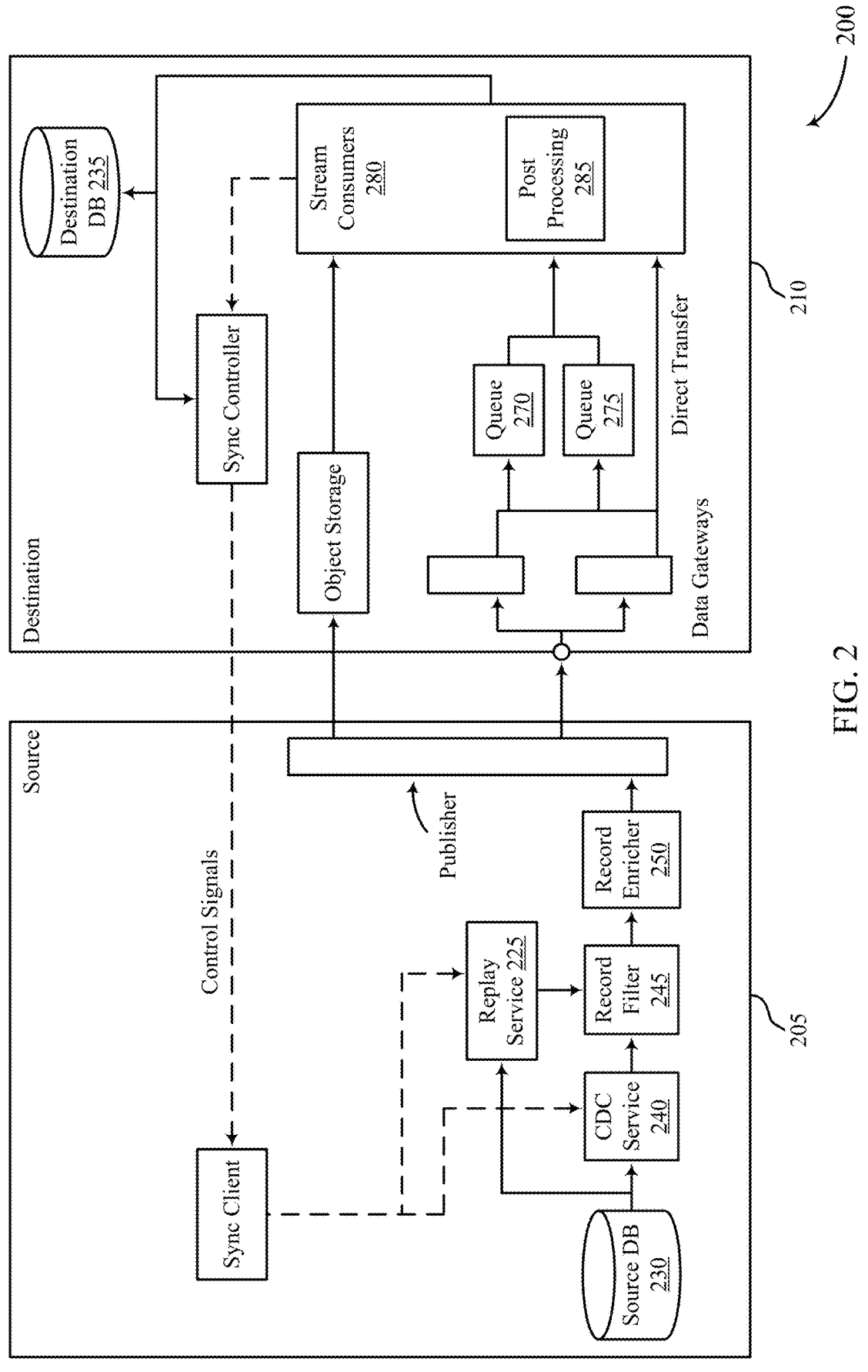
FIGS. 2 and 3 show examples of system diagrams that support techniques for asynchronously pushing metadata in bulk according to one or more aspects of the present disclosure.

FIG. 2 shows an example of a system diagram 200 that supports techniques for asynchronously pushing metadata in bulk according to one or more aspects of the present disclosure. The system diagram 200 may implement or be implemented by aspects of the computing environment 100. For example, the system diagram 200 includes a source computing environment 205 and a destination computing environment 210, which may be examples of logical and/or physical sub-systems of the DMS 110 described with reference to FIG. 1. In the example of FIG. 2, an asynchronous metadata service 225 (also referred to herein as a replay service) may asynchronously push bulk metadata updates from an application in the source computing environment 205 to an application in the destination computing environment 210.

As described herein, applications could be running in multiple data centers and cloud environments. To access metadata of applications running in a different environment, the data can either be fetched synchronously or cached locally. Caching the metadata of an application running in a different environment locally may have performance advantages. Post-processing 285 can also be used when there are changes to data in the local cache. Caching can either be pull-based, where data from each data center is pulled periodically, or push-based, where data centers push changes as they occur. A pull-based model may, in some cases, result in staleness of data up to the polling interval. Hence, a push-based model that can synchronize changes in near real-time (NRT) may be desirable in some deployments.

The system diagram 200 illustrates an example of a push-based NRT mechanism that supports metadata synchronization across applications running in different data centers or cloud environments. The techniques described with reference to FIG. 2 also support mechanisms for ensuring that updates, inserts, and deletes are synchronized from the source computing environment 205 to the destination computing environment 210. Aspects of the present disclosure may enable an application running in the source computing environment (referred to hereinafter as the source) to filter out some data records and enrich the data records before they are sent to an application running in the destination computing environment (referred to hereinafter as the destination). The described techniques may also ensure that a row does not roll back in time, even with clock jumps. The scheme depicted in the example of FIG. 2 may enable applications to detect and recover from synchronization backlogs.

The system diagram 200 supports techniques for synchronizing metadata changes in NRT from any number of metadata sources in a performant and scalable manner. The system diagram 200 also supports techniques for identifying and processing data additions, updates, and deletions. In addition, the techniques described with reference to FIG. 2 support filtering and enrichment of data by sources before the data is pushed to the destination. The system diagram 200 may further support different priorities and isolation among data streams. The described techniques may ensure that a row does not roll back in time, even if there are clock skews between the source and the destination. Aspects of the present disclosure may also support automatic detection and recovery of synchronization backlogs.

As described herein, the system diagram 200 illustrates an example of a push-based NRT mechanism to synchronize metadata between the source and the destination. Multiple sources can be supported for a single destination. The described techniques leverage change data capture (CDC) techniques at source databases to track insert/update/delete operations in metadata tables. Each CDC record may be published to the destination, where stream consumers 280 can store it in the destination database 235.

The destination can push configuration information, such as when to start/stop pushing data, or any filtering to be done on the data, to the source. The destination may, in some examples, want to filter out some changes at the source. To avoid transmitting and/or processing extraneous data, the destination can provide filter conditions to the source. A particular class of updates can be dropped by the record filter 245. The record filter 245 may support at least two types of filtering, namely, relevant column filtering and SQL filtering. For a relevant column filter, the record filter 245 may selectively propagate a row if certain columns have changed. For a SQL filter, the record filter 245 may propagate a row if the row matches a given SQL statement.

The records can also be transformed by the source before they are sent to the destination. For example, an "event" record can be enriched with information about the object associated with the event. The enricher 250 may support different types of enrichments, such as projection enrichments, transformation enrichments, and additive enrichments. For projection enrichments, the destination may select a subset of columns from a table. For transformation enrichments, the value of a column may be transformed by applying a function to the column. This function could take other columns from the same data record. For additive enrichments, poll channels may create a resultant record by combining data from multiple tables and adding data that is generated programmatically. A consistent data view across multiple tables can be obtained using "AS OF SYSTEM TIME" queries to get the version of a row at the specific point in time of the CDC record.

In some implementations, each record generated by the CDC service 240 goes to the record filter 245, where some records may be dropped. The filtering may involve inspecting the CDC records. After filtering, the CDC records pass through different enrichers (such as the enricher 250), where they are transformed. Some enrichment operations may be faster than others. As such, there may be several enricher groups, depending on the latency of each enricher. After record enrichment is complete, the CDC records are sent to the destination, where they are stored in a queue 270. There can be multiple publishers running in parallel. As such, data records may sometimes be published in an order that is different from the order in which they were generated.

The destination may use queues to make consumers 280 and producers independently scalable. There can be one queue for each data source to provide better isolation and prioritization. For example, if a source sends a relatively large number of updates, the influx of data records may not adversely affect the consumption/intake of other sources, as every source has a respective queue. In some implementations, there may be consumer workers listening to each queue responsible for storing updates in the destination database 235. The number of workers for any queue can be configurable to provide higher or lower priority for data sources. Each row in the source may have an update timestamp. Each row in the queue 270 may be parsed, and checks may be performed to determine if a row needs to be updated in the destination.

If the operation type is insert and the row does not exist in the destination, the row may be inserted into the destination database 235. If the operation type is update and the row does not exist in the destination, the row may also be inserted into the destination database 235. Otherwise, if the row exists, the row may be updated if the update time of the row is newer than that of the destination. If the operation type is delete, the row is deleted from the destination database 235 if the update time of the row is newer than that of the destination.

If a data source is delayed in pushing updates, the resulting backlog can be detected at the destination using "checkpoints". For example, the CDC service 240 may send checkpoints for a table at recurring intervals to indicate that all data up to a point in time has been sent for that table. Checkpoints may be sent regardless of whether records are published. The destination may keep track of all checkpoints consumed for a given source. If the latest checkpoint is older than some threshold (e.g., 5 mins), the destination may infer that the source is backlogged. If a backlog is detected at a source, the destination can trigger a "Replay" operation to recover from the backlog, as described with reference to FIGS. 3 through 5. The asynchronous metadata service 225 may help resolve the backlog by publishing rows directly from the source database 230 (bypassing the CDC service 240).

Figure 3:
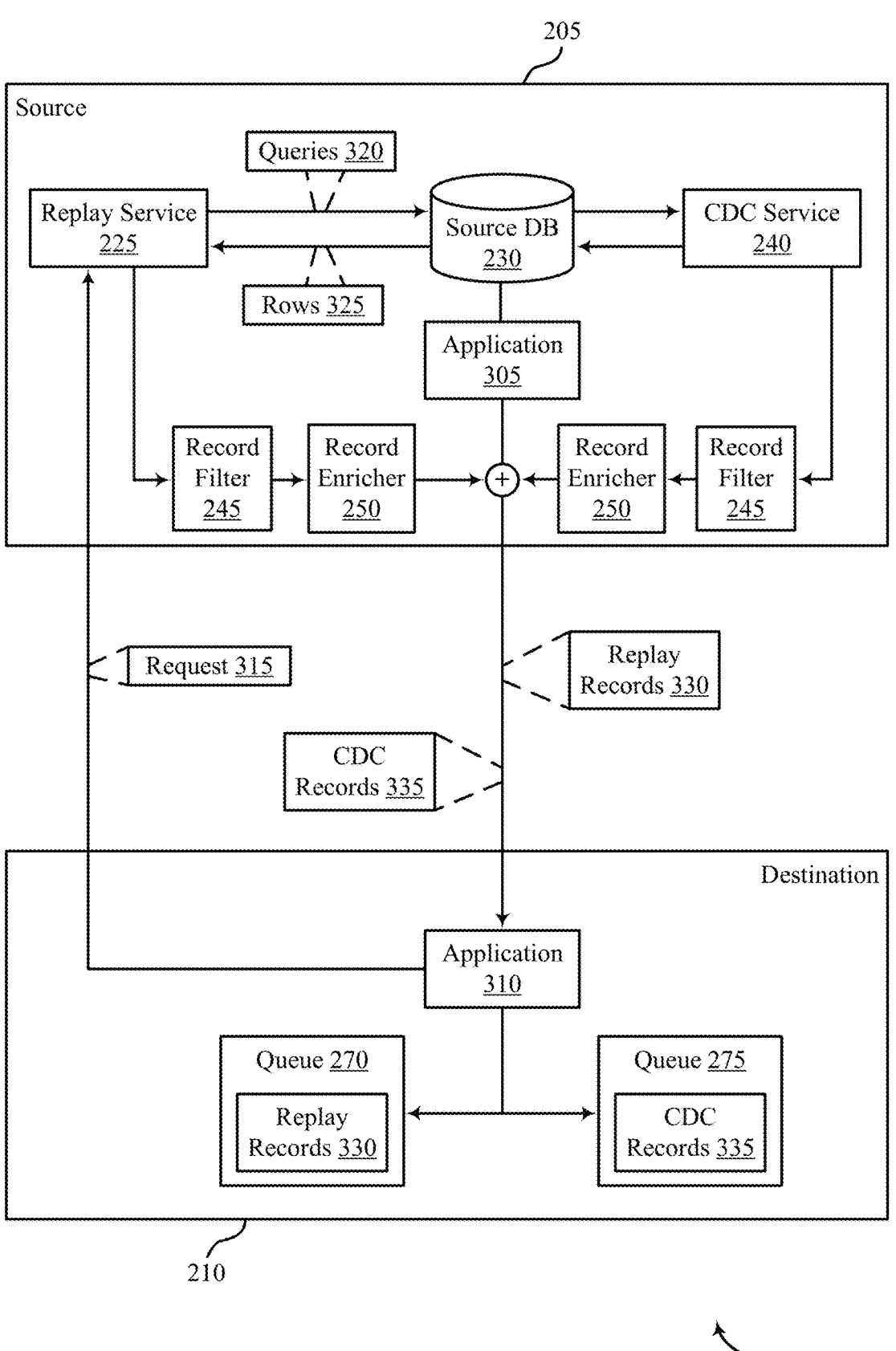

FIG. 3 shows an example of a system diagram 300 that supports techniques for asynchronously pushing metadata in bulk according to one or more aspects of the present disclosure. The system diagram 300 may implement or be implemented by aspects of the computing environment 100 or the system diagram 200, as described with reference to FIGS. 1 and 2. For example, the system diagram 300 includes the source computing environment 205 and the destination computing environment 210, which may be examples of different logical and/or physical sub-systems of the DMS 110, as described with reference to FIGS. 1 and 2. In the example of FIG. 3, the asynchronous metadata service 225 (e.g., "Replay") may process and push bulk metadata updates from an application 305 in the source computing environment 205 (referred to hereinafter as the source) to an application 310 in the destination computing environment 210 (referred to hereinafter as the destination).

Aspects of the present disclosure may leverage CDC to track updates to tables and push them to the destination. In such a model, where incremental updates are pushed to the destination, there can be situations where processing all updates would be computationally infeasible. For example, there may be a large backlog of updates that the destination is unable to process. The techniques described herein support a faster bulk-push approach that can be used to push the latest version of data from the source. An asynchronous metadata stream (equivalently referred to as a replay stream or a second data stream) may result in less data being transferred/pushed in comparison to a corresponding CDC stream (also referred to as an NRT stream or a first data stream), as the asynchronous metadata service 225 may only push the latest version, thereby reducing the processing time and system load.

The asynchronous metadata retrieval techniques described herein can be used in combination with other NRT synchronization approaches, and can be used to recover from a backlog in a CDC stream, initialize new data sources, or send data periodically when real-time synchronization is not required. The described techniques also ensure that updates, inserts, and deletes are synchronized from the source to the destination during a replay stream. Aspects of the present disclosure may further enable the source to filter out some records and enrich the records before sending them to the destination.

The system diagram 300 may support a fast and efficient mechanism for synchronizing the latest changes in bulk from any number of metadata sources. The system diagram 300 may also support techniques for detecting backlogs in real-time CDC streams and recovering or otherwise resolving these backlogs by invoking the asynchronous metadata service 225. The metadata synchronization techniques described with reference to FIG. 2 may help with initializing new data sources and propagating data additions, updates, and deletions. Aspects of the present disclosure may also support filtering and enrichment of data by sources before the data is pushed to the destination. The techniques described herein may also support parallel consumption of asynchronous and NRT streams.

The system diagram 300 illustrates an example of a bulk-push metadata synchronization process between a source and a destination. Multiple sources can be supported for a single destination. The asynchronous metadata service 225 may use queries 320 (such as SQL statements) to directly access the source database 230 and to track changes in metadata tables since a given time t. Each data record may be published to the destination and stored in the destination database 235. The destination can provide the source with configuration information, such as when to start/stop pushing replay data, or any filtering and enrichment to be done to the data. The replay stream can use the same configurations as the CDC stream to maintain compatibility of data across both streams.

A data source can become backlogged due to a number of reasons such as slow processing at the destination, a sudden spike in source data, maintenance at the destination, slow processing at the source, a disconnection between the source and the destination, or other stream-specific reasons (e.g., if a stream has an unsupported rate of updates). If a data source is delayed in pushing updates, this can be detected at the destination using "checkpoints". The CDC service 240 may send a checkpoint for a "table range" every interval (e.g., 10 secs), indicating that all data up to a point in time has been sent for that table range. A table may be distributed into multiple table ranges depending on the database structure, and each range may publish a respective stream independently. Checkpoints may be sent regardless of whether records need to be published. The destination may keep track of all checkpoints consumed for different ranges in a table. If the latest checkpoint for any range exceeds a threshold (e.g., 5 mins), the destination may determine that the source is backlogged. If a backlog is detected at the source, the destination can trigger a "Replay" stream to recover from the backlog. Replay (i.e., the asynchronous metadata service 225) can help the destination catch up with the backlog by publishing rows 325 directly from the source database 230 (bypassing the CDC service 240).

The asynchronous metadata service 225 may support backlog detection and recovery. For example, the asynchronous metadata service 225 may read the rows 325 changed in data sources since a given time t by querying the data source and pushing the rows to the publisher. The application 310 may invoke the asynchronous metadata service 225 by transmitting a request 315 to the asynchronous metadata service 225. The request 315 (e.g., an API call) may optionally include a time-based filter, or the asynchronous metadata service 225 can replay (i.e., parse, process) all rows of a given table. The replay records 330 from the asynchronous metadata service 225 and CDC records 335 from the CDC service 240 may be directed through the same pipeline for data filtering and enrichment used in NRT CDC streams.

One advantage of triggering a replay stream is that the replay stream can push the latest version of rows, and skip or otherwise discard intermediate versions of the rows. Thus, asynchronous replay streams can be consumed faster by the destination (in comparison to CDC streams). When a replay stream is triggered (via the request 315), the asynchronous metadata service 225 can discard older CDC records 335 and restart the stream from current point in time. The CDC stream may be started before the replay stream to ensure no data is missed.

The system diagram 300 may support data source initialization using Replay. When a data source (such as the application 305) connects to a destination (such as the application 310) for the first time, the new data source may have a relatively large amount of data to be pushed/published. Synchronizing all versions of all rows may overload the destination. In such cases, the asynchronous metadata service 225 can be used to synchronize/push the latest version of source data in bulk, after which a CDC stream can begin.

As described herein, separate queues may be configured at the destination for replay records 330 and CDC records 335. For example, the queue 270 may include the replay records 330, while the queue 275 may include the CDC records 335. Each queue may have a corresponding set of workers to manage the throughput of replay streams and CDC streams separately. Replay queues (such as the queue 270) can further be sharded by data sources to independently control the rate of processing for different data sources.

There may be consumer workers monitoring each replay queue responsible for storing updates in the destination database 235. The number of workers for a given queue can be configurable to provide higher or lower priority for data sources.

Each row in the source may have an update timestamp from the source. Each row in the queue 270 may be iterated over, and checks may be performed to determine if a row needs to be updated in the destination. For each row in the queue 270, if the row is absent from the destination, the row may be inserted. If the row is present in the destination, the row may be updated if the update time of the row is newer than that of the destination.

Figure 4:
FIG. 4 shows an example of a deletion scheme that supports techniques for asynchronously pushing metadata in bulk according to one or more aspects of the present disclosure.
Figure 4:

FIG. 4 shows an example of a deletion scheme 400 that supports techniques for asynchronously pushing metadata in bulk according to one or more aspects of the present disclosure. The deletion scheme 400 may implement or be implemented by aspects of any of the computing environments or system diagrams described with reference to FIGS. 1 through 3. For example, the deletion scheme 400 may be implemented by one or more components of the application 310 running in a destination computing environment of the DMS 110, as described with reference to FIGS. 1 through 3. In the example of FIG. 4, the application 310 (referred to hereinafter as the destination) may remove a row 405 from Table_A if a gen_number field associated with the row 405 is different from a latest_gen_number field associated with Table_A.

As described herein, a DMS (such as the DMS 110 described with reference to FIG. 1) may include various distributed nodes or node clusters that provide backup and recovery services for client systems. Some backup processes within the DMS may involve exchanging metadata between applications running in different data centers or cloud environments. For example, an application running in a source computing environment may push metadata to an application running in a destination computing environment such that the metadata is synchronized across the source and the destination. The destination may use the metadata provided by the source to perform various tasks related to database backup, recovery, duplication, restoration, etc.

In some cases, to reduce the volume of information that is transferred from the source to the destination, the source may identify which rows (i.e., within a table that includes metadata associated with the source) have changed since the last exchange, and may push the changed rows to the destination via data records that are processed and stored at the destination. However, if the source becomes disconnected from the destination (and is thus unable to push metadata updates to the destination) or if a backlog of metadata updates accumulates at the source, the destination may be unable to handle (i.e., process) all of the data records. Similarly, if the source is being initialized for the first time, there may be a prohibitive amount of metadata for the destination to process.

Aspects of the present disclosure support techniques for efficiently pushing bulk metadata updates (e.g., updates that involve a relatively large number of metadata changes) from a source application to a destination application. If, for example, the source is being initialized for the first time, the source may have to transfer a greater amount of metadata to the destination (e.g., because the destination has no previous metadata associated with the source). In such examples, the source may reduce the amount of metadata that is transferred to the destination by pushing only the latest (i.e., current) version of the metadata to the destination. Additionally, or alternatively, if the source accumulates a backlog of metadata updates and some of the updates pertain to the same rows, the source can resolve the backlog by pushing only the current values of these rows to the destination. Similarly, if the source becomes disconnected from the destination for an extended period of time (e.g., due to a network outage) and some rows are repeatedly changed in the interim, the source may selectively push the latest values of the rows to the destination when the connection is re-established (for example, by discarding changes that are overwritten by more recent changes).

The bulk-push metadata synchronization techniques described herein may enable the destination to process delete operations in an asynchronous metadata stream (also referred to herein as a second data stream or a replay stream). Deletes may be handled differently for an asynchronous replay queue (such as the queue 270 described with reference to FIG. 2). Since Replay reads directly from the data source, the resulting stream may not include rows that have been deleted. However, the destination can determine which rows were deleted by running comparisons with the data present in the destination database 235. This can be done by triggering a full table replay stream and tracking a version number for each row. Specifically, the destination may get the current version number for rows in the table (where all rows have the same version number). For example, if the current version number is n, for each row provided by the replay stream, the destination may increment the version number by 1. So all rows sent may be associated with the version number n+1. Accordingly, the destination may delete rows with version numbers less than n+1.

If, for example, there is a relatively long disconnect between the source and the destination (e.g., more than X days), a full Replay for Table_A can be initiated to recover from the backlog. Before invoking the full Replay, the latest_gen_number of Table_A may be incremented. Thus, when Table_A is replayed, the latest_gen_number of all updated rows is set to 3 in Table_A. Once the Replay is complete, some rows may have gen_numbers that differ from the latest_gen_number. This state implies that the row 405 (primary key=2) has been deleted, since the row 405 was not returned by the replay stream. Accordingly, the destination may delete rows from Table_A, where gen_number is less than the latest_gen_number of Table_A.

Aspects of the deletion scheme 400 may be implemented to realize one or more of the following advantages. The techniques described with reference to FIG. 4 may enable applications to exchange and synchronize metadata with greater efficiency, lower signaling overhead, and reduced latency, among other benefits. For example, invoking an asynchronous metadata service (e.g., Replay) that has direct access to metadata tables may enable applications to resolve metadata backlogs, quickly initialize new data sources, and periodically exchange metadata when real-time synchronization is not required. As a result, the applications may process fewer extraneous/outdated data records, experience fewer service disruptions, and recover from metadata backlogs with greater efficiency.

Figure 5:
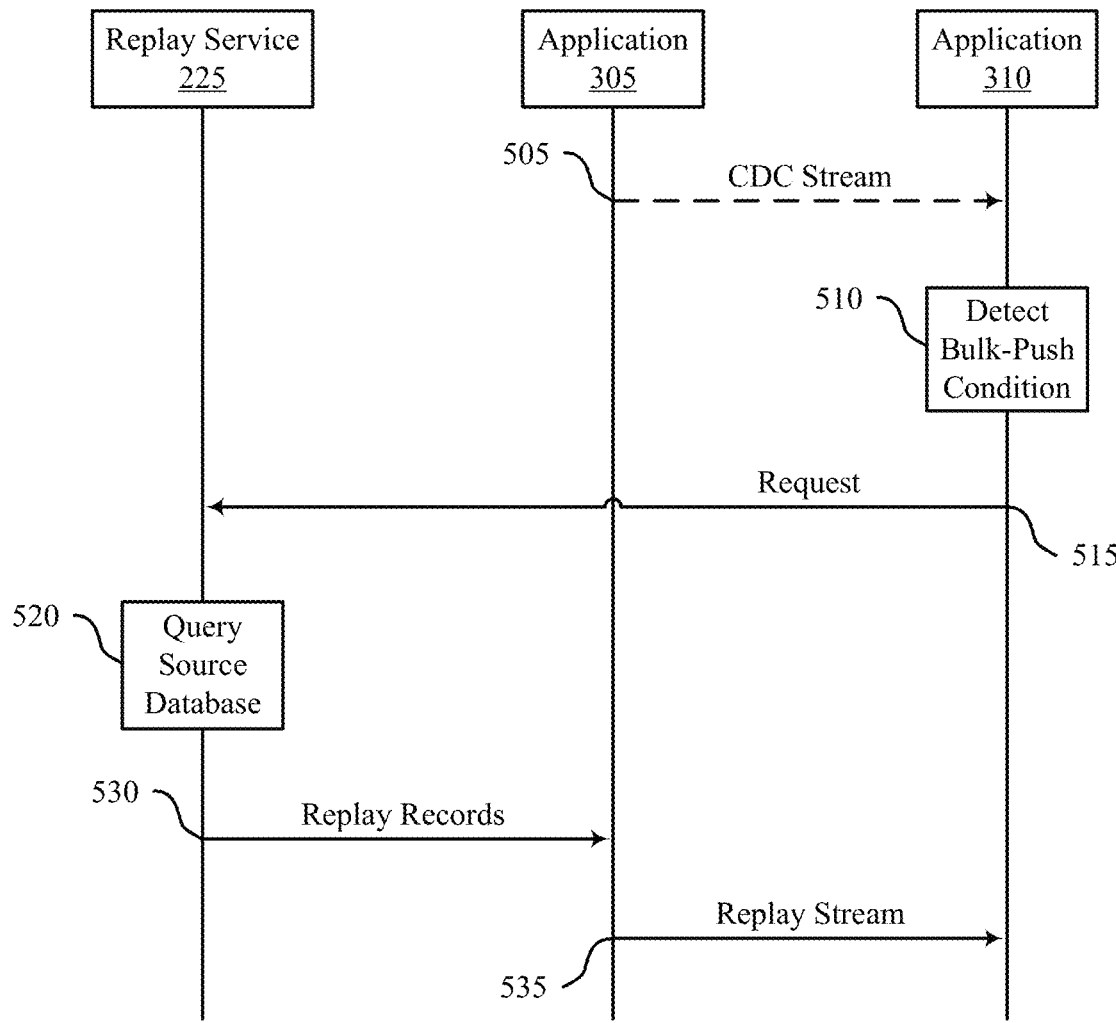
FIG. 5 shows an example of a process flow that supports techniques for asynchronously pushing metadata in bulk according to one or more aspects of the present disclosure.

FIG. 5 shows an example of a process flow 500 that supports techniques for asynchronously pushing metadata in bulk according to one or more aspects of the present disclosure. The process flow 500 may implement or be implemented by aspects of any of the computing environments or system diagrams described with reference to FIGS. 1 through 3. For example, the process flow 500 includes the application 305 and the application 310, which may be examples of corresponding applications described with reference to FIG. 3. Likewise, the process flow 500 includes the asynchronous metadata service 225 (i.e., "Replay"), as described with reference to FIG. 2. In the following description of the process flow 500, operations between the application 305, the application 310, and the asynchronous metadata service 225 may be added, omitted, or performed in a different order (with respect to the exemplary order shown).

In some examples, at 505, the application 310 may establish a CDC data stream (also referred to herein as an NRT stream) between the application 305 in the source computing environment and the application 310 in the destination computing environment. The CDC data stream may enable the application 305 to push metadata updates to the application 310 in the form of CDC records (such as the CDC records 335 described with reference to FIG. 3) that capture metadata changes in substantially real-time. Each CDC record may correspond to a row that was updated, added, or deleted from a source database (such as the source database 230 described with reference to FIG. 2).

At 510, the application 310 may determine that a bulk-push criterion is satisfied for the application 305 in the source computing environment. For example, the application 310 may detect a backlog in the CDC data stream based on a processing speed of the application 310, a rate of incoming data from the application 305, a maintenance status of the application 310, a processing speed of the application 305, a connection status between the application 305 and the application 310, or a rate of updates associated with the CDC data stream, among other examples. Additionally, or alternatively, the application 310 may determine that the application 305 is a new data source, or that real time metadata synchronization is not required for the application 305.

At 515, application 310 may invoke the asynchronous metadata service 225 by transmitting a request (such as an API call) to the asynchronous metadata service 225. The request may include an identifier of the application 305, an identifier of the CDC data stream, a time-based filter for an asynchronous data stream, or a combination thereof. In some examples, the application 310 may stop the CDC data stream, discard older CDC records, restart the CDC data stream, and trigger (i.e., invoke) the asynchronous data stream by transmitting the request to the asynchronous metadata service 225.

At 520, the asynchronous metadata service 225 may query a source database associated with the application 305 to determine the latest values of one or more rows that include metadata associated with the application 305. The asynchronous metadata service 225 may query the source database directly, bypassing a CDC service associated with the CDC data stream. Accordingly, the asynchronous metadata service 225 may retrieve or otherwise obtain the latest version (i.e., values) of these rows directly from the source database (for example, by executing one or more SQL queries).

At 530, the asynchronous metadata service 225 may create data records (such as the replay records 330 described with reference to FIG. 3) that include the latest version of metadata associated with the application 305. In some examples, the data records may be filtered and/or enriched before the data records are published to the application 310. For example, a filtering component may remove one or more of the data records based on filtering criteria associated with the application 310. Likewise, a set of enrichers (such as the enricher 250 described with reference to FIG. 2) may perform a combination of projection enrichments, additive enrichments, and/or programmatic enrichments on the data records such that the data records can be properly ingested and processed by the application 310.

At 535, the asynchronous metadata service 225 may publish (i.e., transmit) the filtered and/or enriched data records to the application 310 via a replay stream. The data records may include the latest values of the metadata rows identified by the asynchronous metadata service 225. The application 310 may store the data records in a dedicated queue, such as the queue 270 described with reference to FIG. 2. In some examples, the application 310 may associate the replay records with a generation number (i.e., latest_gen_number) to determine which rows were deleted from the source database, as described with reference to FIG. 4.

Figure 6:
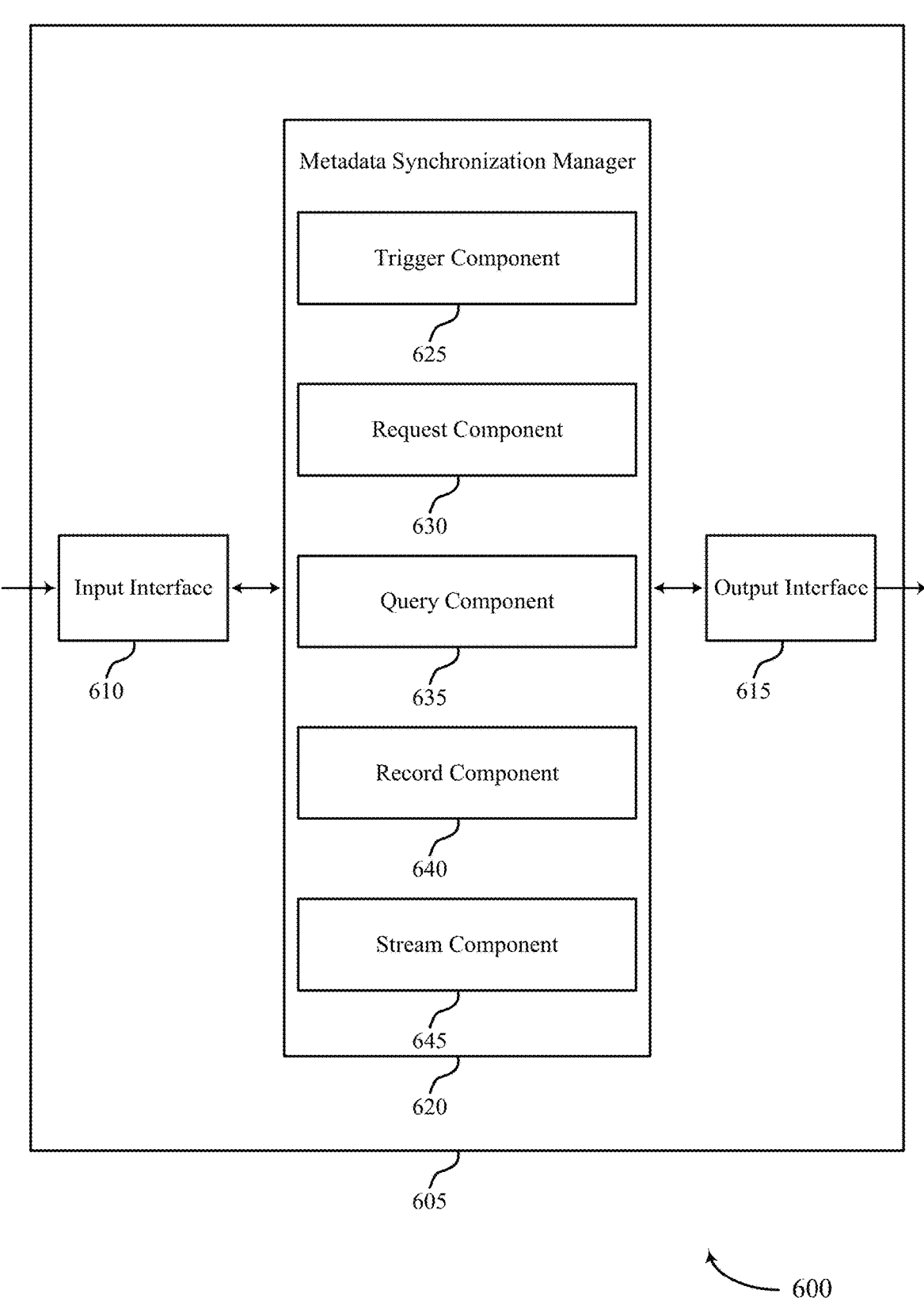
FIG. 6 shows a block diagram of an apparatus that supports techniques for asynchronously pushing metadata in bulk according to one or more aspects of the present disclosure.

FIG. 6 shows a block diagram 600 of a system 605 that supports techniques for asynchronously pushing metadata in bulk according to one or more aspects of the present disclosure. In some examples, the system 605 may be an example of aspects of one or more components described with reference to FIG. 1, such as a DMS 110. The system 605 may include an input interface 610, an output interface 615, and a metadata synchronization manager 620. The system 605 may also include one or more processors. Each of these components may be in communication with one another (e.g., via one or more buses, communications links, communications interfaces, or any combination thereof).

The input interface 610 may manage input signaling for the system 605. For example, the input interface 610 may receive input signaling (e.g., messages, packets, data, instructions, commands, or any other form of encoded information) from other systems or devices. The input interface 610 may send signaling corresponding to (e.g., representative of or otherwise based on) such input signaling to other components of the system 605 for processing. For example, the input interface 610 may transmit such corresponding signaling to the metadata synchronization manager 620 to support techniques for asynchronously pushing metadata in bulk. In some cases, the input interface 610 may be a component of a network interface 825, as described with reference to FIG. 8.

The output interface 615 may manage output signaling for the system 605. For example, the output interface 615 may receive signaling from other components of the system 605, such as the metadata synchronization manager 620, and may transmit such output signaling corresponding to (e.g., representative of or otherwise based on) such signaling to other systems or devices. In some cases, the output interface 615 may be a component of a network interface 825, as described with reference to FIG. 8.

For example, the metadata synchronization manager 620 may include a trigger component 625, a request component 630, a query component 635, a record component 640, a stream component 645, or any combination thereof. In some examples, the metadata synchronization manager 620, or various components thereof, may be configured to perform various operations (e.g., receiving, monitoring, transmitting) using or otherwise in cooperation with the input interface 610, the output interface 615, or both. For example, the metadata synchronization manager 620 may receive information from the input interface 610, send information to the output interface 615, or be integrated in combination with the input interface 610, the output interface 615, or both to receive information, transmit information, or perform various other operations as described herein.

The metadata synchronization manager 620 may support data management in accordance with examples disclosed herein. The trigger component 625 may be configured to support determining, by a first application in a destination computing environment of a DMS, that a bulk-push criterion is satisfied for a second application in a source computing environment of the DMS. The request component 630 may be configured to support transmitting, to an asynchronous metadata service associated with the DMS, a request indicating the second application for which the bulk-push criterion is satisfied, where the request is configured to cause the asynchronous metadata service to query a database in the source computing environment to identify a latest version of one or more rows that include metadata associated with the second application for which the bulk-push criterion is satisfied and generate one or more data records indicating the latest version of the one or more rows that include the metadata associated with the second application for which the bulk-push criterion is satisfied. The stream component 645 may be configured to support receiving, via an asynchronous data stream between the first application in the destination computing environment and the second application in the source computing environment, the one or more data records generated by the asynchronous metadata service.

Figure 7:
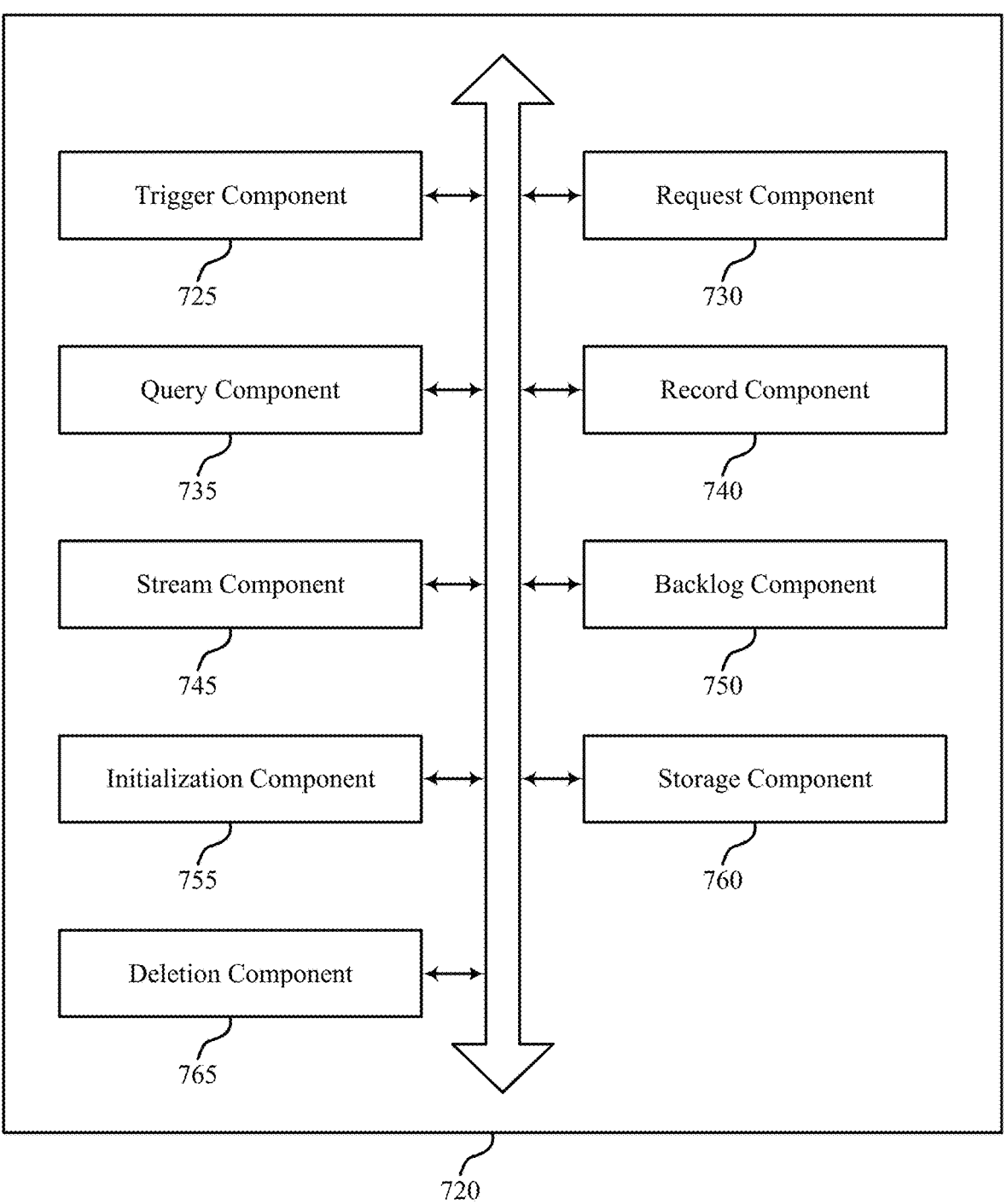
FIG. 7 shows a block diagram of a metadata synchronization manager that supports techniques for asynchronously pushing metadata in bulk according to one or more aspects of the present disclosure.

FIG. 7 shows a block diagram 700 of a metadata synchronization manager 720 that supports techniques for asynchronously pushing metadata in bulk according to one or more aspects of the present disclosure. The metadata synchronization manager 720 may be an example of aspects of a metadata synchronization manager or a metadata synchronization manager 620, or both, as described herein. The metadata synchronization manager 720, or various components thereof, may be an example of means for performing various aspects of techniques for asynchronously pushing metadata in bulk as described herein. For example, the metadata synchronization manager 720 may include a trigger component 725, a request component 730, a query component 735, a record component 740, a stream component 745, a backlog component 750, an initialization component 755, a storage component 760, a deletion component 765, or any combination thereof. Each of these components may communicate, directly or indirectly, with one another (e.g., via one or more buses, communications links, communications interfaces, or any combination thereof).

The metadata synchronization manager 720 may support data management in accordance with examples disclosed herein. The trigger component 725 may be configured to support determining, by a first application in a destination computing environment of a DMS, that a bulk-push criterion is satisfied for a second application in a source computing environment of the DMS. The request component 730 may be configured to support transmitting, to an asynchronous metadata service associated with the DMS, a request indicating the second application for which the bulk-push criterion is satisfied. The request may be configured to cause the asynchronous metadata service to query a database in the source computing environment to identify a latest version of one or more rows that include metadata associated with the second application for which the bulk-push criterion is satisfied and generate one or more data records indicating the latest version of the one or more rows that include the metadata associated with the second application for which the bulk-push criterion is satisfied. The stream component 745 may be configured to support receiving, via an asynchronous data stream between the first application in the destination computing environment and the second application in the source computing environment, the one or more data records generated by the asynchronous metadata service.

In some examples, to determine that the bulk-push criterion is satisfied, the backlog component 750 may be configured to support detecting a backlog in a real-time data stream between the second application and the first application, and the trigger component 725 may be configured to support invoking the asynchronous metadata service to resolve the backlog in the real-time data stream.

In some examples, detection of the backlog is based on a processing speed of the first application in the destination computing environment, a rate of incoming data from the second application in the source computing environment, a maintenance status of the first application in the destination computing environment, a processing speed of the second application in the source computing environment, a connection status of the second application in the source computing environment, or a rate of updates associated with the real-time data stream.

In some examples, detection of the backlog is based on a checkpoint associated with a table range in the database satisfying a temporal threshold. In some examples, the request further indicates the checkpoint satisfying the temporal threshold, thereby causing the asynchronous metadata service to query the database, identify metadata changes that occurred after the checkpoint, and push the metadata changes to the first application via the asynchronous data stream.

In some examples, the stream component 745 may be configured to support stopping a real-time data stream between the second application and the first application after the backlog is detected. In some examples, the record component 740 may be configured to support discarding all data records from the real-time data stream that precede a current time. In some examples, the stream component 745 may be configured to support restarting the real-time data stream from the current time. In some examples, the trigger component 725 may be configured to support initiating the asynchronous data stream from the checkpoint that satisfied the temporal threshold.

In some examples, the first application in the destination computing environment is capable of ingesting data records from the asynchronous metadata service in parallel with data records from a real-time metadata service associated with the DMS. In some examples, the request is further configured to cause the asynchronous metadata service to read all rows of a table in the database that includes the metadata associated with the second application.

In some examples, to support determining that the bulk-push criterion is satisfied, the initialization component 755 may be configured to support determining that the second application in the source computing environment is a new data source that is being initialized.

In some examples, to support determining that the bulk-push criterion is satisfied, the trigger component 725 may be configured to support invoking the asynchronous metadata service to initialize the new data source. In some examples, the request is further configured to cause the asynchronous metadata service to begin the asynchronous data stream from an earliest time for the new data source.

In some examples, the stream component 745 may be configured to support starting a real-time data stream between the first application and the second application from a current time before invoking the asynchronous metadata service.

In some examples, to support determining that the bulk-push criterion is satisfied, the trigger component 725 may be configured to support determining that real-time metadata synchronization is not required for the second application in the source computing environment.

In some examples, to support determining that the bulk-push criterion is satisfied, the trigger component 725 may be configured to support invoking the asynchronous metadata service to periodically push the latest version of the metadata to the first application in the destination computing environment.

In some examples, the request is further configured to cause one or more sub-components of the source computing environment to filter and enrich the one or more data records before pushing the one or more data records to the second application via the asynchronous data stream.

In some examples, the storage component 760 may be configured to support storing the one or more data records corresponding to the latest version of metadata associated with the second application in a second database associated with the destination computing environment.

In some examples, data records associated with the asynchronous data stream are stored in a first queue within the destination computing environment, and data records associated with real-time data streams are stored in a second queue within the destination computing environment.

In some examples, the deletion component 765 may be configured to support determining that at least one row of a table that includes the metadata associated with the second application was deleted based on a difference between a generation number associated with the at least one row and a latest generation number of the table.

In some examples, the trigger component 725 may be configured to support invoking the asynchronous metadata service based on a duration of a disconnection between the first application and the second application.

Figure 8:
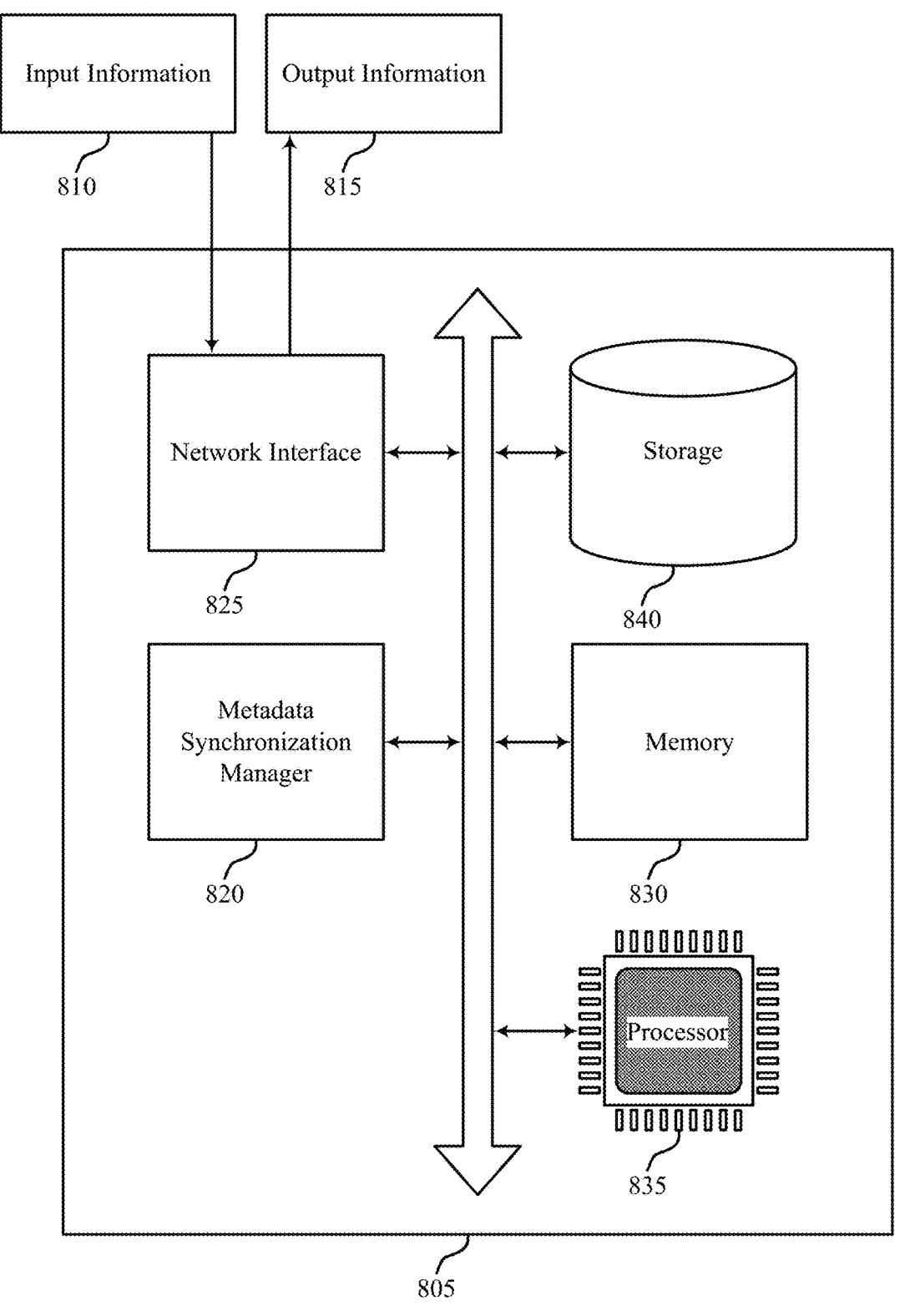
FIG. 8 shows a diagram of a system including a device that supports techniques for asynchronously pushing metadata in bulk according to one or more aspects of the present disclosure.

FIG. 8 shows a block diagram 800 of a system 805 that supports techniques for asynchronously pushing metadata in bulk according to one or more aspects of the present disclosure. The system 805 may be an example of or include the components of a system 605 as described herein. The system 805 may include components for data management, including components such as a metadata synchronization manager 820, an input information 810, an output information 815, a network interface 825, at least one memory 830, at least one processor 835, and a storage 840. These components may be in electronic communication or otherwise coupled with each other (e.g., operatively, communicatively, functionally, electronically, electrically; via one or more buses, communications links, communications interfaces, or any combination thereof). Additionally, the components of the system 805 may include corresponding physical components or may be implemented as corresponding virtual components (e.g., components of one or more virtual machines). In some examples, the system 805 may be an example of aspects of one or more components described with reference to FIG. 1, such as a DMS 110.

The network interface 825 may enable the system 805 to exchange information (e.g., input information 810, output information 815, or both) with other systems or devices (not shown). For example, the network interface 825 may enable the system 805 to connect to a network (e.g., a network 120 as described herein). The network interface 825 may include one or more wireless network interfaces, one or more wired network interfaces, or any combination thereof. In some examples, the network interface 825 may be an example of may be an example of aspects of one or more components described with reference to FIG. 1, such as one or more network interfaces 165.

The at least one memory 830 may include RAM, ROM, or both. The at least one memory 830 may store computer-readable, computer-executable software including instructions that, when executed, cause the at least one processor 835 to perform various functions described herein. In some cases, the at least one memory 830 may contain, among other things, a basic input/output system (BIOS), which may control basic hardware or software operation such as the interaction with peripheral components or devices. In some cases, the at least one memory 830 may be an example of aspects of one or more components described with reference to FIG. 1, such as one or more memories 175.

The at least one processor 835 may include an intelligent hardware device, (e.g., a general-purpose processor, a digital signal processor (DSP), a, a microcontroller, an application-specific integrated circuit (ASIC), a field programmable gate array (FPGA), a programmable logic device, a discrete gate or transistor logic component, a discrete hardware component, or any combination thereof). The at least one processor 835 may be configured to execute computer-readable instructions stored in at least one memory 830 to perform various functions (e.g., functions or tasks supporting techniques for asynchronously pushing metadata in bulk). Though a single processor 835 is depicted in the example of FIG. 8, it is to be understood that the system 805 may include any quantity of one or more of processors 835 and that a group of processors 835 may collectively perform one or more functions ascribed herein to at least one processor, such as the at least one processor 835. In some cases, the at least one processor 835 may be an example of aspects of one or more components described with reference to FIG. 1, such as one or more processors 170.

Storage 840 may be configured to store data that is generated, processed, stored, or otherwise used by the system 805. In some cases, the storage 840 may include one or more HDDs, one or more SSDs, or both. In some examples, the storage 840 may be an example of a single database, a distributed database, multiple distributed databases, a data store, a data lake, or an emergency backup database. In some examples, the storage 840 may be an example of one or more components described with reference to FIG. 1, such as one or more network disks 180.

The metadata synchronization manager 820 may support data management in accordance with examples disclosed herein. For example, the metadata synchronization manager 820 may be configured to support determining, by a first application in a destination computing environment of a DMS, that a bulk-push criterion is satisfied for a second application in a source computing environment of the DMS. The metadata synchronization manager 820 may be configured to support transmitting, to an asynchronous metadata service associated with the DMS, a request indicating the second application for which the bulk-push criterion is satisfied, where the request is configured to cause the asynchronous metadata service to query a database in the source computing environment to identify a latest version of one or more rows that include metadata associated with the second application for which the bulk-push criterion is satisfied and generate one or more data records indicating the latest version of the one or more rows that include the metadata associated with the second application for which the bulk-push criterion is satisfied. The metadata synchronization manager 820 may be configured to support receiving, via an asynchronous data stream between the first application in the destination computing environment and the second application in the source computing environment, the one or more data records generated by the asynchronous metadata service.

By including or configuring the metadata synchronization manager 820 in accordance with examples as described herein, the system 805 may support techniques for techniques for asynchronously pushing metadata in bulk, which may provide one or more benefits such as, for example, more efficient utilization of processing resources, lower signaling overhead, and reduced latency, among other possibilities.

FIG. 9 shows a flowchart illustrating a method 900 that supports techniques for asynchronously pushing metadata in bulk according to one or more aspects of the present disclosure. The operations of the method 900 may be implemented by a DMS or components thereof, as described herein. For example, the operations of the method 900 may be performed by a DMS 110, as described with reference to FIGS. 1 through 8. In some examples, the DMS may execute a set of instructions to control the functional elements of the DMS to perform the described functions. Additionally, or alternatively, the DMS may perform aspects of the described functions using special-purpose hardware.

At 905, the method may include determining, by a first application in a destination computing environment of a DMS, that a bulk-push criterion is satisfied for a second application in a source computing environment of the DMS. The operations of 905 may be performed in accordance with examples disclosed herein. In some examples, aspects of the operations of 905 may be performed by a trigger component 725, as described with reference to FIG. 7.

At 910, the method may include transmitting, to an asynchronous metadata service associated with the DMS, a request indicating the second application for which the bulk-push criterion is satisfied, where the request is configured to cause the asynchronous metadata service to query a database in the source computing environment to identify a latest version of one or more rows that include metadata associated with the second application for which the bulk-push criterion is satisfied and generate one or more data records indicating the latest version of the one or more rows that include the metadata associated with the second application for which the bulk-push criterion is satisfied. The operations of 910 may be performed in accordance with examples disclosed herein. In some examples, aspects of the operations of 910 may be performed by a record component 740, as described with reference to FIG. 7.

At 915, the method may include receiving, via an asynchronous data stream between the first application in the destination computing environment and the second application in the source computing environment, the one or more data records generated by the asynchronous metadata service. The operations of 915 may be performed in accordance with examples disclosed herein. In some examples, aspects of the operations of 915 may be performed by a stream component 745, as described with reference to FIG. 7.

A method for data management is described. The method may include: determining, by a first application in a destination computing environment of a DMS, that a bulk-push criterion is satisfied for a second application in a source computing environment of the DMS; transmitting, to an asynchronous metadata service associated with the DMS, a request indicating the second application for which the bulk-push criterion is satisfied, where the request is configured to cause the asynchronous metadata service to query a database in the source computing environment to identify a latest version of one or more rows that include metadata associated with the second application for which the bulk-push criterion is satisfied and generate one or more data records indicating the latest version of the one or more rows that include the metadata associated with the second application for which the bulk-push criterion is satisfied; and receiving, via an asynchronous data stream between the first application in the destination computing environment and the second application in the source computing environment, the one or more data records generated by the asynchronous metadata service.

An apparatus for data management is described. The apparatus may include at least one processor, memory coupled with the at least one processor, and instructions stored in the at least one memory. The instructions may be executable by the at least one processor to cause the apparatus to: determine, by a first application in a destination computing environment of a DMS, that a bulk-push criterion is satisfied for a second application in a source computing environment of the DMS; transmit, to an asynchronous metadata service associated with the DMS, a request indicating the second application for which the bulk-push criterion is satisfied, where the request is configured to cause the asynchronous metadata service to query a database in the source computing environment to identify a latest version of one or more rows that include metadata associated with the second application for which the bulk-push criterion is satisfied and generate one or more data records indicating the latest version of the one or more rows that include the metadata associated with the second application for which the bulk-push criterion is satisfied; and receive, via an asynchronous data stream between the first application in the destination computing environment and the second application in the source computing environment, the one or more data records generated by the asynchronous metadata service.

Another apparatus for data management is described. The apparatus may include: means for determining, by a first application in a destination computing environment of a DMS, that a bulk-push criterion is satisfied for a second application in a source computing environment of the DMS; means for transmitting, to an asynchronous metadata service associated with the DMS, a request indicating the second application for which the bulk-push criterion is satisfied, where the request is configured to cause the asynchronous metadata service to query a database in the source computing environment to identify a latest version of one or more rows that include metadata associated with the second application for which the bulk-push criterion is satisfied and generate one or more data records indicating the latest version of the one or more rows that include the metadata associated with the second application for which the bulk-push criterion is satisfied; and means for receiving, via an asynchronous data stream between the first application in the destination computing environment and the second application in the source computing environment, the one or more data records generated by the asynchronous metadata service.

A non-transitory computer-readable medium storing code for data management is described. The code may include instructions executable by at least one processor to: determine, by a first application in a destination computing environment of a DMS, that a bulk-push criterion is satisfied for a second application in a source computing environment of the DMS; transmit, to an asynchronous metadata service associated with the DMS, a request indicating the second application for which the bulk-push criterion is satisfied, where the request is configured to cause the asynchronous metadata service to query a database in the source computing environment to identify a latest version of one or more rows that include metadata associated with the second application for which the bulk-push criterion is satisfied and generate one or more data records indicating the latest version of the one or more rows that include the metadata associated with the second application for which the bulk-push criterion is satisfied; and receive, via an asynchronous data stream between the first application in the destination computing environment and the second application in the source computing environment, the one or more data records generated by the asynchronous metadata service.

In some examples of the methods, apparatuses, and non-transitory computer-readable media described herein, determining that the bulk-push criterion is satisfied may include operations, features, means, or instructions for detecting a backlog in a real-time data stream between the second application and the first application, and invoking the asynchronous metadata service to resolve the backlog in the real-time data stream.

In some examples of the methods, apparatuses, and non-transitory computer-readable media described herein, detection of the backlog may be based on a processing speed of the first application in the destination computing environment, a rate of incoming data from the second application in the source computing environment, a maintenance status of the first application in the destination computing environment, a processing speed of the second application in the source computing environment, a connection status of the second application in the source computing environment, or a rate of updates associated with the real-time data stream.

In some examples of the methods, apparatuses, and non-transitory computer-readable media described herein, detection of the backlog may be based on a checkpoint associated with a table range in the database satisfying a temporal threshold.

In some examples of the methods, apparatuses, and non-transitory computer-readable media described herein, the request further indicates the checkpoint satisfying the temporal threshold, thereby causing the asynchronous metadata service to query the database, identify metadata changes that occurred after the checkpoint, and push the metadata changes to the first application via the asynchronous data stream.

Some examples of the methods, apparatuses, and non-transitory computer-readable media described herein may further include operations, features, means, or instructions for stopping a real-time data stream between the second application and the first application after the backlog is detected, discarding all data records from the real-time data stream that precede a current time, restarting the real-time data stream from the current time, and initiating the asynchronous data stream from the checkpoint that satisfied the temporal threshold.

In some examples of the methods, apparatuses, and non-transitory computer-readable media described herein, the first application in the destination computing environment may be capable of ingesting data records from the asynchronous metadata service in parallel with data records from a real-time metadata service associated with the DMS.

In some examples of the methods, apparatuses, and non-transitory computer-readable media described herein, the request may be further configured to cause the asynchronous metadata service to read all rows of a table in the database that includes the metadata associated with the second application.

In some examples of the methods, apparatuses, and non-transitory computer-readable media described herein, determining that the bulk-push criterion is satisfied may include operations, features, means, or instructions for determining that the second application in the source computing environment is a new data source that is being initialized, and invoking the asynchronous metadata service to initialize the new data source.

In some examples of the methods, apparatuses, and non-transitory computer-readable media described herein, the request may be further configured to cause the asynchronous metadata service to begin the asynchronous data stream from an earliest time for the new data source.

Some examples of the methods, apparatuses, and non-transitory computer-readable media described herein may further include operations, features, means, or instructions for starting a real-time data stream between the first application and the second application from a current time before invoking the asynchronous metadata service.

In some examples of the methods, apparatuses, and non-transitory computer-readable media described herein, determining that the bulk-push criterion is satisfied may include operations, features, means, or instructions for determining that real-time metadata synchronization is not required for the second application in the source computing environment, and invoking the asynchronous metadata service to periodically push the latest version of the metadata to the first application in the destination computing environment.

In some examples of the methods, apparatuses, and non-transitory computer-readable media described herein, the request may be further configured to cause one or more sub-components of the source computing environment to filter and enrich the one or more data records before pushing the one or more data records to the second application via the asynchronous data stream.

Some examples of the methods, apparatuses, and non-transitory computer-readable media described herein may further include operations, features, means, or instructions for storing the one or more data records corresponding to the latest version of metadata associated with the second application in a second database associated with the destination computing environment.

In some examples of the methods, apparatuses, and non-transitory computer-readable media described herein, data records associated with the asynchronous data stream may be stored in a first queue within the destination computing environment and data records associated with real-time data streams may be stored in a second queue within the destination computing environment.

Some examples of the methods, apparatuses, and non-transitory computer-readable media described herein may further include operations, features, means, or instructions for determining that at least one row of a table including the metadata associated with the second application was deleted based on a difference between a generation number associated with the at least one row and a latest generation number of the table.

Some examples of the methods, apparatuses, and non-transitory computer-readable media described herein may further include operations, features, means, or instructions for invoking the asynchronous metadata service based on a duration of a disconnection between the first application and the second application.

The following provides an overview of aspects of the present disclosure:

Aspect 1: A method for data management, including: determining, by a first application in a destination computing environment of a DMS, that a bulk-push criterion is satisfied for a second application in a source computing environment of the DMS; transmitting, to an asynchronous metadata service associated with the DMS, a request indicating the second application for which the bulk-push criterion is satisfied, where the request is configured to cause the asynchronous metadata service to: query a database in the source computing environment to identify a latest version of one or more rows that include metadata associated with the second application for which the bulk-push criterion is satisfied; and generate one or more data records including the latest version of the one or more rows that include the metadata associated with the second application for which the bulk-push criterion is satisfied; and receiving, via an asynchronous data stream between the first application in the destination computing environment and the second application in the source computing environment, the one or more data records generated by the asynchronous metadata service.

Aspect 2: The method of aspect 1, where determining that the bulk-push criterion is satisfied includes: detecting a backlog in a real-time data stream between the second application and the first application; and invoking the asynchronous metadata service to resolve the backlog in the real-time data stream.

Aspect 3: The method of aspect 2, where detection of the backlog is based on a processing speed of the first application in the destination computing environment, a rate of incoming data from the second application in the source computing environment, a maintenance status of the first application in the destination computing environment, a processing speed of the second application in the source computing environment, a connection status of the second application in the source computing environment, or a rate of updates associated with the real-time data stream.

Aspect 4: The method of any of aspects 2 through 3, where detection of the backlog is based on a checkpoint associated with a table range in the database satisfying a temporal threshold.

Aspect 5: The method of aspect 4, where the request further indicates the checkpoint satisfying the temporal threshold, thereby causing the asynchronous metadata service to query the database, identify metadata changes that occurred after the checkpoint, and push the metadata changes to the first application via the asynchronous data stream.

Aspect 6: The method of any of aspects 4 through 5, further including: stopping a real-time data stream between the second application and the first application after the backlog is detected; discarding all data records from the real-time data stream that precede a current time; restarting the real-time data stream from the current time; and initiating the asynchronous data stream from the checkpoint that satisfied the temporal threshold.

Aspect 7: The method of any of aspects 4 through 6, where the first application in the destination computing environment is capable of ingesting data records from the asynchronous metadata service in parallel with data records from a real-time metadata service associated with the DMS.

Aspect 8: The method of any of aspects 1 through 7, where the request is further configured to cause the asynchronous metadata service to read all rows of a table in the database that includes the metadata associated with the second application.

Aspect 9: The method of any of aspects 1 through 8, where determining that the bulk-push criterion is satisfied includes: determining that the second application in the source computing environment is a new data source that is being initialized; and invoking the asynchronous metadata service to initialize the new data source.

Aspect 10: The method of aspect 9, where the request is further configured to cause the asynchronous metadata service to begin the asynchronous data stream from an earliest time for the new data source.

Aspect 11: The method of any of aspects 1 through 10, further including: starting a real-time data stream between the first application and the second application from a current time before invoking the asynchronous metadata service.

Aspect 12: The method of any of aspects 1 through 11, where determining that the bulk-push criterion is satisfied includes: determining that real-time metadata synchronization is not required for the second application in the source computing environment; and invoking the asynchronous metadata service to periodically push the latest version of the metadata to the first application in the destination computing environment.

Aspect 13: The method of any of aspects 1 through 12, where the request is further configured to cause one or more sub-components of the source computing environment to filter and enrich the one or more data records before pushing the one or more data records to the second application via the asynchronous data stream.

Aspect 14: The method of any of aspects 1 through 13, further including: storing the one or more data records corresponding to the latest version of metadata associated with the second application in a second database associated with the destination computing environment.

Aspect 15: The method of any of aspects 1 through 14, where: data records associated with the asynchronous data stream are stored in a first queue within the destination computing environment; and data records associated with real-time data streams are stored in a second queue within the destination computing environment.

Aspect 16: The method of any of aspects 1 through 15, further including: determining that at least one row of a table including the metadata associated with the second application was deleted based on a difference between a generation number associated with the at least one row and a latest generation number of the table.

Aspect 17: The method of any of aspects 1 through 16, further including: invoking the asynchronous metadata service based on a duration of a disconnection between the first application and the second application.

Aspect 18: An apparatus for data management, including: at least one processor; at least one memory coupled with the at least one processor; and instructions stored in the at least one memory, where the instructions are executable by the at least one processor to cause the apparatus to perform a method of any of aspects 1 through 17.

Aspect 19: An apparatus for data management, including: at least one means for performing a method of any of aspects 1 through 17.

Aspect 20: A non-transitory computer-readable medium storing code for data management, the code including instructions that are executable by at least one processor to perform a method of any of aspects 1 through 17.

It should be noted that the methods described above describe possible implementations, and that the operations and the steps may be rearranged or otherwise modified and that other implementations are possible. Furthermore, aspects from two or more of the methods may be combined.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the at least one processor may be any conventional processor, controller, microcontroller, or state machine. At least one processor may also be implemented as a combination of computing devices (e.g., a combination of a DSP and a microprocessor, multiple microprocessors, one or more microprocessors in conjunction with a DSP core, or any other such configuration).

Any functions or operations described herein as being capable of being performed by at least one processor may be performed by multiple processors that, individually or collectively, are capable of performing the described functions or operations. For example, the functions described herein may be performed by multiple processors, each tasked with at least a subset of the described functions, such that, collectively, the multiple processors perform all of the described functions. As such, the described functions can be performed by a single processor or a group of processors functioning together (i.e., collectively) to perform the described functions, where any one processor performs at least a subset of the described functions.

Any functions or operations described herein as being capable of being performed by at least one memory may be performed by multiple memories that, individually or collectively, are capable of performing the described functions or operations. For example, the functions described herein may be performed by multiple memories, each tasked with at least a subset of the described functions, such that, collectively, the multiple memories perform all of the described functions. As such, the described functions can be performed by a single memory or a group of memories functioning together (i.e., collectively) to perform the described functions, where any one memory performs at least a subset of the described functions.

The functions described herein may be implemented in hardware, software executed by at least one processor, firmware, or any combination thereof. If implemented in software executed by at least one processor, the functions may be stored on or transmitted over as one or more instructions or code on a computer-readable medium. Other examples and implementations are within the scope of the disclosure and appended claims. For example, due to the nature of software, functions described above can be implemented using software executed by at least one processor, hardware, firmware, hardwiring, or combinations of any of these. Features implementing functions may also be physically located at various positions, including being distributed such that portions of functions are implemented at different physical locations. Further, a system as used herein may be a collection of devices, a single device, or aspects within a single device.

Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

As used herein, including in the claims, the article "a" before a noun is open-ended and understood to refer to "at least one" of those nouns or "one or more" of those nouns. Thus, the terms "a," "at least one," "one or more," "at least one of one or more" may be interchangeable. For example, if a claim recites "a component" that performs one or more functions, each of the individual functions may be performed by a single component or by any combination of multiple components. Thus, the term "a component" having characteristics or performing functions may refer to "at least one of one or more components" having a particular characteristic or performing a particular function. Subsequent reference to a component introduced with the article "a" using the terms "the" or "said" refers to any or all of the one or more components. For example, a component introduced with the article "a" shall be understood to mean "one or more components," and referring to "the component" subsequently in the claims shall be understood to be equivalent to referring to "at least one of the one or more components."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, EEPROM) compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for data management, comprising:
transmitting a request based at least in part on a bulk-push criterion being satisfied for a real-time data stream between a first application in a destination computing environment of a data management system and a second application in a source computing environment of the data management system, the bulk-push criterion being based at least in part on a capability of the first application and the second application to process a backlog associated with the real-time data stream, the request including a first identifier of the second application for which the bulk-push criterion is satisfied and a second identifier of the real-time data stream; and
receiving one or more data records comprising a latest version of one or more rows that include metadata associated with the real-time data stream.

2. The method of claim 1, further comprising:
initiating the real-time data stream between the first application and the second application after receiving the one or more data records.

3. The method of claim 1, further comprising:
transmitting one or more filter conditions to the source computing environment, wherein receiving the latest version of the one or more rows is based at least in part on the one or more rows satisfying the one or more filter conditions.

4. The method of claim 3, wherein the one or more filter conditions comprise a column filter indicating one or more columns, wherein receiving the one or more rows is based at least in part on the one or more columns in the one or more rows comprising a change.

5. The method of claim 3, wherein the one or more filter conditions comprise a structured query language (SQL) filter indicating an SQL statement, wherein receiving the one or more rows is based at least in part on the one or more rows matching the SQL statement.

6. The method of claim 1, further comprising:
updating one or more second rows corresponding to the one or more rows at a database of the destination computing environment based at least in part on one or more first update times associated with the one or more second rows being later than one or more second update times associated with the one or more rows.

7. The method of claim 1, wherein the bulk-push criterion being satisfied is based at least in part on a processing speed of the first application in the destination computing environment, a rate of incoming data from the second application in the source computing environment, a maintenance status of the first application in the destination computing environment, a processing speed of the second application in the source computing environment, a connection status of the second application in the source computing environment, or a rate of updates associated with the real-time data stream.

8. The method of claim 1, wherein receiving the one or more data records further comprises:
receiving, via an asynchronous data stream associated with an asynchronous metadata service, the one or more data records.

9. The method of claim 8, further comprising:
detecting the backlog associated with the real-time data stream between the second application and the first application, wherein the bulk-push criterion being satisfied is based at least in part on detecting the backlog; and
invoking the asynchronous metadata service to resolve the backlog in the real-time data stream.

10. The method of claim 9, wherein detection of the backlog is based at least in part on a checkpoint associated with a table range in a database at the source computing environment satisfying a temporal threshold.

11. The method of claim 10, wherein the request further indicates the checkpoint satisfying the temporal threshold, thereby causing the asynchronous metadata service to query the database, identify metadata changes that occurred after the checkpoint, and push the metadata changes to the first application via the asynchronous data stream.

12. The method of claim 10, further comprising:
stopping the real-time data stream between the second application and the first application after the backlog is detected;
discarding all data records from the real-time data stream that precede a current time;
restarting the real-time data stream from the current time; and
initiating the asynchronous data stream from the checkpoint that satisfied the temporal threshold.

13. The method of claim 10, wherein the first application in the destination computing environment is capable of ingesting data records from the asynchronous metadata service in parallel with data records from a real-time metadata service associated with the data management system.

14. The method of claim 8, wherein determining that the bulk-push criterion is satisfied comprises:
invoking the asynchronous metadata service to initialize a new data source based at least in part on the second application in the source computing environment being the new data source.

15. The method of claim 8, further comprising:
starting the real-time data stream between the first application and the second application from a current time before invoking the asynchronous metadata service.

16. The method of claim 8, wherein determining that the bulk-push criterion is satisfied comprises:
determining that real-time metadata synchronization is not required for the second application in the source computing environment; and
invoking the asynchronous metadata service to periodically push the latest version of the metadata to the first application in the destination computing environment.

17. The method of claim 8, wherein:
data records associated with the asynchronous data stream are stored in a first queue within the destination computing environment; and
data records associated with real-time data streams are stored in a second queue within the destination computing environment.

18. The method of claim 8, further comprising:
invoking the asynchronous metadata service based at least in part on a duration of a disconnection between the first application and the second application.

19. An apparatus for data management, comprising:
one or more memories storing processor-executable code; and
one or more processors coupled with the one or more memories and individually or collectively operable to execute the code to cause the apparatus to:
transmit a request based at least in part on a bulk-push criterion being satisfied for a real-time data stream between a first application in a destination computing environment of a data management system and a second application in a source computing environment of the data management system, the bulk-push criterion being based at least in part on a capability of the first application and the second application to process a backlog associated with the real-time data stream, the request including a first identifier of the second application for which the bulk-push criterion is satisfied and a second identifier of the real-time data stream; and
receive one or more data records comprising a latest version of one or more rows that include metadata associated with the real-time data stream.

20. A non-transitory computer-readable medium storing code for data management, the code comprising instructions executable by one or more processors to:
transmit a request based at least in part on a bulk-push criterion being satisfied for a real-time data stream between a first application in a destination computing environment of a data management system and a second application in a source computing environment of the data management system, the bulk-push criterion being based at least in part on a capability of the first application and the second application to process a backlog associated with the real-time data stream, the request including a first identifier of the second application for which the bulk-push criterion is satisfied and a second identifier of the real-time data stream; and
receive one or more data records comprising a latest version of one or more rows that include metadata associated with the real-time data stream.

* * * * *